United States Patent [19]

Lee et al.

[11] Patent Number: 5,308,219
[45] Date of Patent: May 3, 1994

[54] PROCESS FOR AUTOMATICALLY CONTROLLING ACTUATORS OF EXCAVATOR

[75] Inventors: Jin H. Lee, Seo-Myeon; Jin T. Kim, Changweon; Jang U. Jo, Chungmu; Bong D. Hoang, Changweon; Ju K. Kim, Busan; Sang T. Jeong, Seoul, all of Rep. of Korea

[73] Assignee: Samsung Heavy Industries Co., Ltd., Changwon, Rep. of Korea

[21] Appl. No.: 765,162

[22] Filed: Sep. 23, 1991

[30] Foreign Application Priority Data

| Sep. 29, 1990 [KR] | Rep. of Korea | 90-15861 |
| Oct. 29, 1990 [KR] | Rep. of Korea | 90-17387 |
| Nov. 1, 1990 [KR] | Rep. of Korea | 90-17672 |
| Nov. 13, 1990 [KR] | Rep. of Korea | 90-18304 |
| Dec. 29, 1990 [KR] | Rep. of Korea | 90-22389 |
| May 2, 1991 [KR] | Rep. of Korea | 91-7081 |

[51] Int. Cl.$^5$ ............................................. E02F 3/00
[52] U.S. Cl. ................................ 414/695.5; 414/699; 91/508
[58] Field of Search ............ 414/699, 687, 695.5, 414/700, 701, 708, 686; 91/508

[56] References Cited

U.S. PATENT DOCUMENTS

| 4,561,341 | 12/1985 | Aikawa | 414/687 X |
| 4,875,337 | 10/1989 | Sugiyama et al. | 414/699 X |
| 4,938,023 | 7/1990 | Yoshino | 414/687 X |
| 5,062,350 | 11/1991 | Tanaka et al. | 414/699 X |
| 5,116,186 | 5/1992 | Hanamoto et al. | 414/699 X |

FOREIGN PATENT DOCUMENTS

| 0407231 | 1/1991 | European Pat. Off. | 414/699 |
| 54-4402 | 1/1979 | Japan | 414/699 |
| 61-9453 | 3/1986 | Japan | 414/699 |
| 1076549 | 2/1984 | U.S.S.R. | 414/699 |
| 91/00397 | 1/1991 | World Int. Prop. O. | 414/699 |
| 91/02162 | 2/1991 | World Int. Prop. O. | 414/699 |

Primary Examiner—Michael S. Huppert
Assistant Examiner—Donald W. Underwood
Attorney, Agent, or Firm—Price, Heneveld, Cooper, DeWitt & Litton

[57] ABSTRACT

An automatic actuating system for actuators of excavator. The system of this invention automatically controls the bucket which is overloaded to be free from the overloaded state thereof, the bucket to maintain an angular position with respect to the absolute line of the ground surface so as to prevent the objects contained in the bucket from being dropped, the bucket cylinder and the boom cylinder to accomplish the desired surface finishing operation by handling for the dipper cylinder, actuators to limit the operational ranges thereof, optimal quantity of hydraulic fluid flow of the main hydraulic pumps for respective actuators, and the pre-running for the actuators.

2 Claims, 19 Drawing Sheets

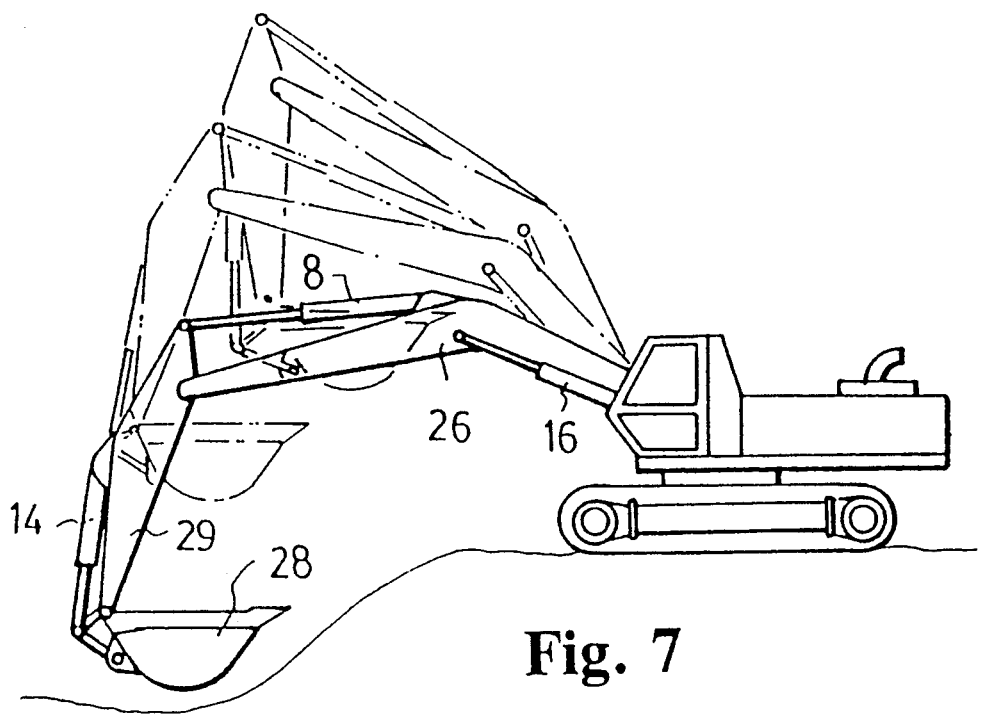
Fig. 7
Fig. 8
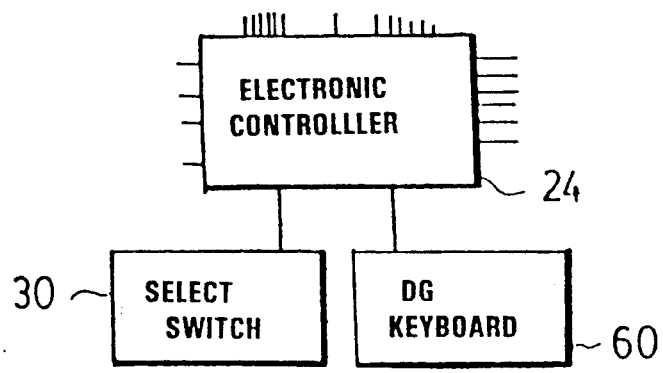

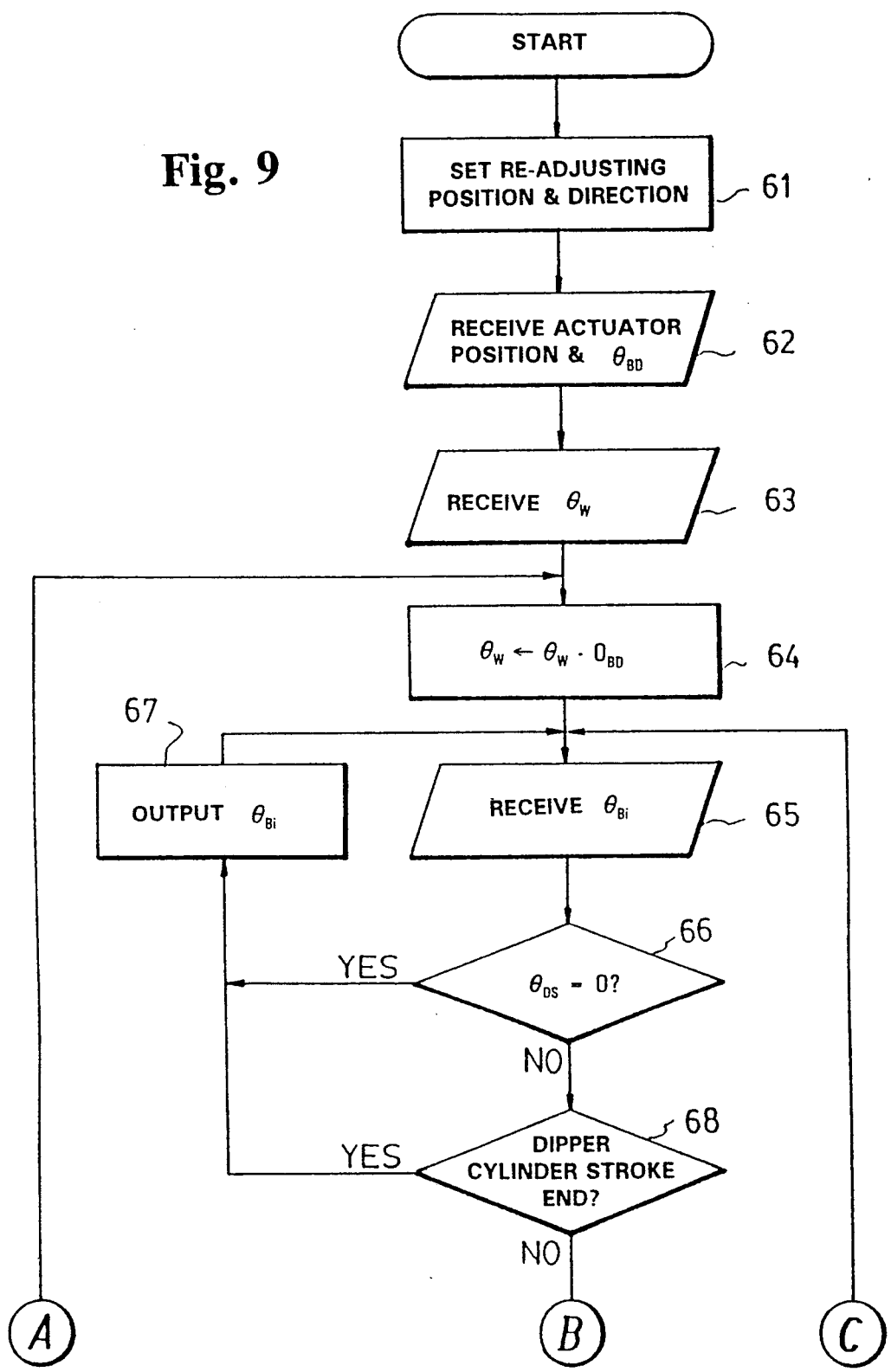

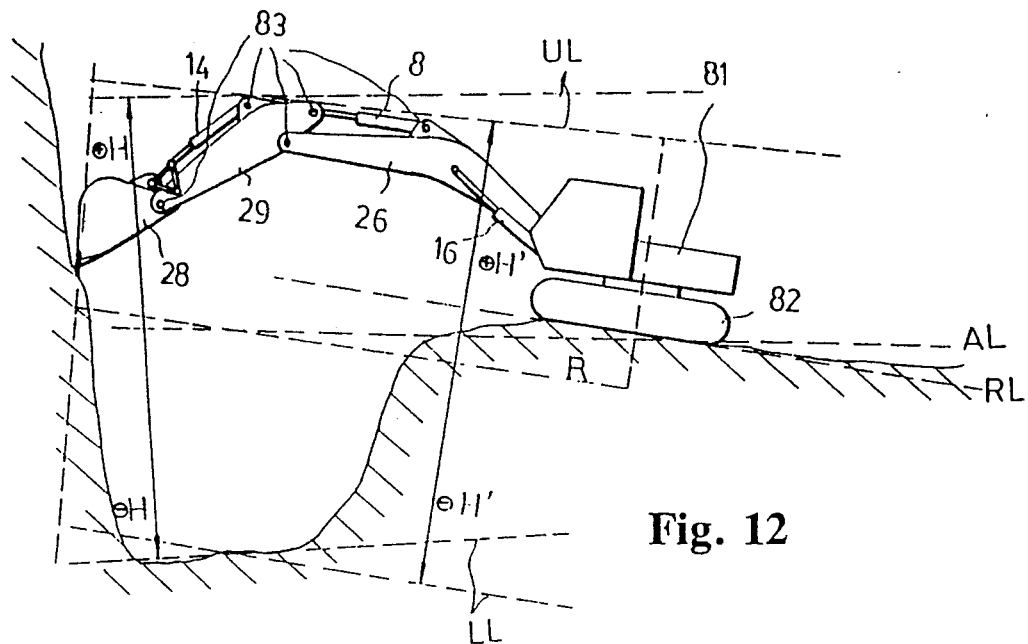
Fig. 12
Fig. 13
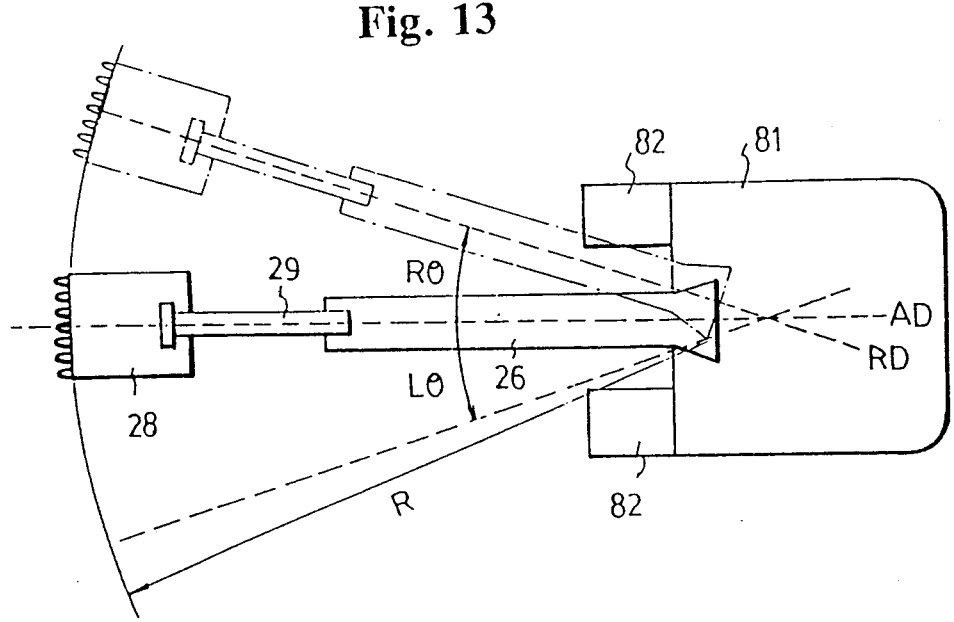

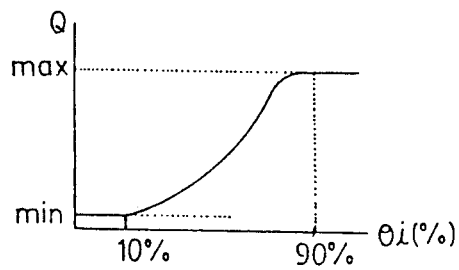
Fig. 18
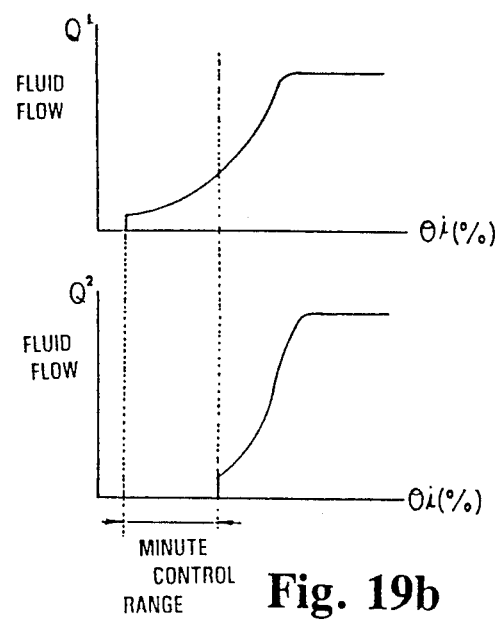
Fig. 19a
Fig. 19b
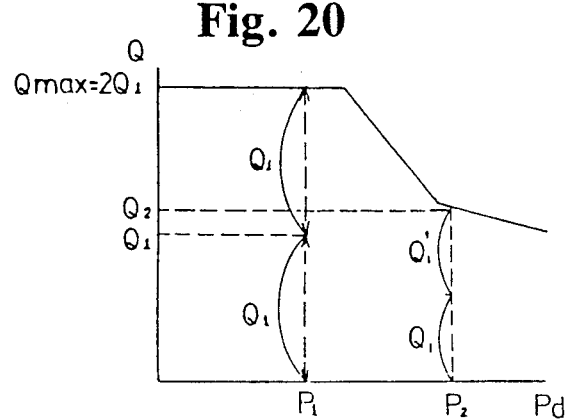
Fig. 20
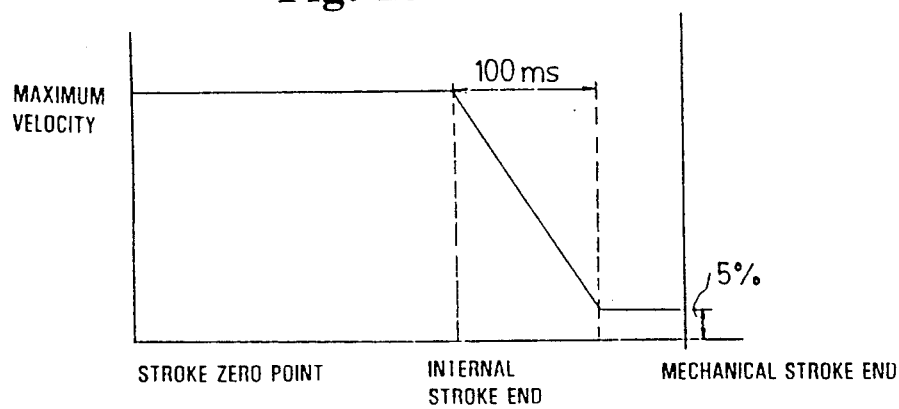
Fig. 23

PROCESS FOR AUTOMATICALLY CONTROLLING ACTUATORS OF EXCAVATOR

BACKGROUND OF THE INVENTION

1. Field of The Invention

The present invention relates to an actuating system for excavator, a kind of construction machinery, and more particularly to an automatic actuating system for actuators, such as a boom cylinder, a dipper cylinder, a bucket cylinder, a swing motor and a pair of travel motors, of the excavator capable of improving the operational effect of the actuators and the facility in controlling the actuators.

2. Description of The Prior Art

Conventionally, excavators are provided with a plurality of actuators which are actuated by hydraulic power and comprise a driving motor section comprising the swing motor for swinging an upper frame provided with a control cab with respect to a lower frame provided with travelling members, such as crawlers, and the travel motors for travelling the excavators, and an actuating cylinder section comprising the dipper cylinder for driving a dipper stick, the boom cylinder for driving a boom and the bucket cylinder for driving a bucket. The actuators are controlled by means of control levers/control pedals which are provided in the cab and handled by the operator in order to efficiently carry out several operations of the excavator such as excavating operations, surface finishing operations, loading operations and the like.

However, known excavators have the following disadvantages resulting in fatigue of the operator and occurrence of safety accident during operations carried out thereby.

First, there is a disadvantage in that the bucket of the excavator may become stuck or overloaded, such as by engaging a heavy rock, large volume of soil contained thereon or the like. In this case, the operators conventionally handle the control levers/pedals so as to actuate the actuating cylinders, such as the boom cylinder, the dipper cylinder and the bucket cylinder, to drive the overloaded bucket in opposite direction to the excavating direction so as to allow the overloaded bucket to be free from the overloaded state. However, an unskilled operator feels uneasiness because of shake of the excavator car body resulting from a shock imposed thereto due to the overloaded bucket so that he often controls the actuators to move more extent than the actuators need, thereby causing the operational efficiency of the excavator to be considerably deteriorated, while a skilled operator can efficiently handle the actuating cylinders to actuate the overloaded bucket to move backwards in a desired distance and then move up to a desired height, and also actuate the bucket to move in the excavating direction in order to continue the excavating operation under a desired condition without any overload.

Second, the control levers/pedals are handled by hands and feet of the operator at the same time during the operations by the excavator so that it needs skilled handling and careful attention of the operator. Especially, during excavating operation by the excavator, objects such as soil and the like which are excavated and contained in the bucket has to move without dropping thereof in order to be loaded in a truck or poured to another place. Thus, the operator pays careful attention in handling the control lever for the bucket cylinder simultaneously with handling another levers/pedals such as for the dipper cylinder, the boom cylinder, the swing motor or the travel motors in order to allow the open upper portion of the bucket to be parallel with or maintained at an angle with respect to the absolute horizontal line of earth. Thus, the known excavators have a disadvantage in that serious fatigue of the operator occurs in accordance with repeated excavating operation so that the excavating operation can not be continued for a long time, and furthermore in case of unskilled operator, the operational efficiency is deteriorated due to unskilled handling for the several control levers/pedals for actuating several actuators at the same time.

Third, the control levers and pedals are handled by hands and feet of the operator at the same time during the operations by the excavator so that it needs skilled handling and careful attention of the operator. Especially, during surface finishing operation by the excavator, the operator first handles the control lever for the bucket cylinder to cause the front tip or the bottom of the bucket to closely contact with the ground surface which is to be finished, and he then handles the control levers/pedals for actuating the dipper cylinder, the boom cylinder, the swing motor or the travel motors in order to carry out the desired surface finishing operation with respect to the ground surface. Thereafter, simultaneously with handling the levers/pedals for another actuators except for the bucket cylinder and the boom cylinder in order to carry out the surface finishing operation the operator has to handle the levers for the bucket cylinder and the boom cylinder to prevent the front tip or the bottom of the bucket from being separated from the ground surface during running of the excavator. Hence, the operator has to have skilled handling and pays careful attention in handling the lever for the bucket cylinder and the boom cylinder simultaneously with handling the levers/pedals for the dipper cylinder, the swing motor or the travel motors in order to carry out the surface finishing operation simultaneously with allowing the front tip or the bottom of the bucket to contact with the ground surface. In accordance, the known excavators have a disadvantage in that serious fatigue of the operator occurs in accordance with repeated surface finishing operation so that the excavating operation can not be continued for a long time, and furthermore it is very difficult to handle the control levers/pedals for several actuators at the same time.

Fourth, the known excavator has a disadvantage in that its actuators are overly driven in accordance with miss-handling of the control levers/pedals, thereby causing safety accidents such that actuating parts such as boom strikes neighboring constructions such as buildings while the swing motor is driven so as to swing the upper frame of the excavator with respect to the lower frame, and also the bucket in case of excavating operation unconsciously strikes underground constructions such as an underground water line, an underground wiring or an oil pipeline.

Fifth, The known excavators use the hydraulic fluid outputted from the hydraulic pumps for actuating a spool of a directional control valve for each actuator. If there is provided in the excavator only a hydraulic pump commonly connected to whole actuators, the pump must require a large capacity capable of efficient actuating the spools of the whole directional control valves at the same time as demanded. However, in case of requiring relatively lower hydraulic power due to requirement of actuating a part of actuators, considerable power loss occurs in the hydraulic pump due to driving the pump of large capacity even though there needs only low hydraulic power, thereby causing the driving power of the engine for driving the hydraulic pump to be unnecessarily required, thereby causing considerable power loss. Thus, the known excavators are generally provided with a parallel type hydraulic circuit comprising a pair of hydraulic pumps, each directly connected to each half of the actuators and having relatively small capacity than the above-mentioned pump of large capacity, thereby preventing the power loss as much as possible. As required, the parallel type hydraulic circuit is provided with hydraulic Pumps of variable capacity so that when a part of the actuators needs not be actuated, a hydraulic pump connected to the actuators which are not actuated is not driven, thereby preventing the power loss as much as possible. However, if the hydraulic circuit comprises a pair of main hydraulic pumps each simply connected to each corresponding half of the actuators without any cross connection with another half of actuators so that each pump provides hydraulic power to corresponding actuators, the pumps can not commonly provide hydraulic power thereof to an actuator which is overloaded resulting in requiring relatively high hydraulic power, thereby causing the overloaded actuator to be troubled. In result, the parallel type hydraulic circuit is provided with cross connections, each connecting the inlet line of an actuator connected one of the main hydraulic pumps, said actuator being to be often overloaded, with the inlet line of another actuator connected to the other pump so as to allow the hydraulic fluid from the one pump to be supplied to the other actuator cross-connected to the one actuator as the other actuator requires relatively large quantity of fluid flow due to overload thereon, thereby efficiently driving the overloaded actuator without any trouble of the main pumps.

However, simultaneously with cross-connecting the actuators, which are often overloaded, each main hydraulic pump is directly connected to its own actuators. Thus, in case of occurrence of overload on an actuator of the actuators connected to each other, a main pump directly connected thereto supplies almost of required quantity of hydraulic fluid flow to the overloaded actuator, while the other pump being cross-connected to the overloaded actuator only supplies small part of required quantity of fluid flow. In result, both hydraulic pumps can not equally provide a quantity of hydraulic fluid flow to the actuator which is overloaded, thereby causing the pump directly connected to the overloaded actuator to overly drive, resulting in occurrence of trouble thereof, but causing the other pump being cross-connected to the overloaded actuator to drive with considerable reserve. Also, each main hydraulic pump can not equally provide respective desired quantity of hydraulic fluid flow to the respective actuators connected to each main pump due to hydraulic fluid distribution characteristics according to the load thereon so that an actuator is driven at high speed while another actuator is driven at low speed. In other words, the actuating speeds of respective actuators are different from each other. In accordance, the known excavator has another disadvantages in that the hydraulic pumps are often overly driven due to unequal quantity of hydraulic fluid flow outputted from both pumps to the actuator which is often overloaded and directly connected to a pump and cross-connected to the other pump. Thus, the desired operation such as excavating operation, surface finishing operation and the like can not be efficiently carried out due to unequal distribution of the quantity of hydraulic fluid flow from each main hydraulic pump to respective actuators directly connected to the pump.

Sixth, the excavator needs pre-running for each actuator thereof before practice running in order to check the condition of the actuator, the zero point of each sensor nearly mounted to the actuator for sensing the actuating condition of the actuator and lubricating condition of each operating element, such as the boom, the dipper stick, the bucket or the like. However, the pre-running is manually carried out one by one by the operator for each actuator. Thus, the known excavator has another disadvantage in that the pre-running manually carried out one by one by the operator needs cumbersome handling of the control levers/pedals and consumption of considerable long time, and furthermore in case of occurrence of miss in checking the actuating condition of each actuator during the pre-running, a serious safety accident easily occurs such as due to trouble of the actuators.

SUMMARY OF THE INVENTION

It is, therefore, an object of the present invention to provide an automatic actuating system for actuators of excavator in which the above disadvantages can be overcome and an automatic control process for controlling an overloaded bucket to be free from the overloaded state is provided, by which process the excavator is automatically controlled so as to allow the overloaded bucket of the excavator to be automatically actuated in order to be free from the overloaded state as it is caught on an overload over a load level such as due to being caught on heavy rock or containing large volume of soil therein, and then the bucket to continuously carry out its desired excavating operation, thereby automatically removing the overload state of the bucket.

It is another object of the present invention to provide an automatic actuating system for actuators of excavator which provides an automatic control process for maintaining the bucket in loading operation as desired, in which process if the control lever for the bucket cylinder is positioned at the neutral position during the excavating operation or the surface finishing operation, the open upper portion of the bucket is automatically maintained so as to be parallel or positioned at an angle to the absolute horizontal line ground surface not to allow the objects contained in the bucket to drop, thereby removing difficulty in handling the control levers/pedals for the actuators at the same time in order to maintain the open upper portion of the bucket to be parallel or positioned at an angle to the horizontal line, thereby reducing fatigue of the operator and improving the working effect of the excavator.

It is still another object of the present invention to provide an automatic actuating system for actuators of excavator which provides an automatic control process for the bucket during surface finishing operation, in which process, in accordance with simple handling for the control levers/pedals for dipper cylinder and swing motor, the bucket cylinder or the boom cylinder is automatically controlled so as to allow the front tip or the bottom of the bucket to closely contact with the ground surface which is to be adjusted, thereby simplifying the handling of the control levers/pedals during the land re-adjuring operation, and removing occurrence of fatigue of the operator and also improving the working effect of the excavator.

It is still another object of the present invention to provide an automatic actuating system for actuators of excavator in which the actuating range of the actuators are automatically controlled so as to be limited within a safety working range.

It is still another object of the present invention to provide an automatic actuating system for actuators of excavator which provides an automatic control process for controlling the quantity of hydraulic fluid flow, in which process the main hydraulic pumps each outputs an equal hydraulic power to respective actuators connected to each pump in proportion to respective loads each loaded on the actuators, and in case that several actuators are actuated at the same time, each hydraulic pump distributes proportional quantity of hydraulic fluid flow to respective actuators directly connected thereto in proportion to respective loads on the actuators so as to drive the actuators at an equal speed, thereby improving the distribution performance of hydraulic fluid of the main pumps, preventing overload of the hydraulic pumps and improving the independent handling performance of each actuator.

It is still another object of the present invention to provide an automatic actuating system for actuators of excavator in which pre-running for respective actuators can be efficiently carried out at the same time by means of simple handling of a button in the cab.

In one aspect, the present invention includes a process for automatically controlling an apparatus for operating an excavator. The apparatus includes a pair of adjustable volume hydraulic pumps with swash plates and swash plate control valves, an engine operably connected to the hydraulic pumps, a plurality of actuators operably connected to the hydraulic pumps, directional control valves operably connected to the pumps and actuators, and control levers and control pedals for generating electric control signals to control the actuators. The process comprises the steps of determining positional values of the actuators to be actuated in response to electric control signals received from the control levers and control pedals for controlling the actuators; determining a quantity of hydraulic fluid under pressure to be delivered from the hydraulic pumps to the actuators; and determining values representing the desired position of the directional control valves in order to cause the determined quantity of hydraulic fluid under pressure to be efficiently supplied to the actuators. The process further comprises limiting the output volume of the hydraulic pumps in accordance with the determined quantity of the hydraulic fluid to be supplied to the actuators and in accordance with the determined values of the directional control valves; and outputting electric signals representing the limited pump output volumes of the hydraulic pumps to swash plate control valves by way of an amplifier so as to control inclination angles of swash plates on the hydraulic pumps and in turn control the pump output volumes.

In another aspect, the present invention includes a process for automatically controlling and apparatus for operating an excavator. The apparatus including a pair of hydraulic pumps driven by an engine and a plurality of actuators actuated by pump deliveries of the hydraulic pumps, directional control valves operably connected to the actuators, and control levers and control pedals for generating electric control signals to control the actuators. The process comprises the steps of determining handling values of the control levers and control pedals for controlling the actuators upon reception of electric control signals outputted from the control levers and control pedals; calculating desired actuating speeds of the actuators in accordance with the determined handling values of the control levers and control pedals; and calculating actual actuation speeds of the actuators as sensed by displacement sensors of the actuators. The process further includes comparing the desired actuation speeds of the actuators with the actual actuation speeds of the actuators and determining whether the actuators are overloaded, and determining whether at least two actuators are being driven at the same time and whether at least two actuators and being driven by both of the hydraulic pumps, and further determining whether a control process for removing an overload condition on the actuators was performed in a previous operation of the excavator, and still further determining whether controlled actuation speeds stored in the apparatus are equal to the actual actuation speeds of the actuators. The process still further includes outputting electric signals representing the controlled actuation speeds of the actuators when it is determined that the actual actuation speeds of the actuators are equal to the controlled actuation speeds of the actuators, but calculating a quantity of hydraulic fluid under pressure to be supplied to the actuators in accordance with a given load on the actuators when it is determined that the actual actuation speeds of the actuators are not equal to the controlled actuation speeds of the actuators; and outputting control signals to the directional control valves for controlling said directional control valves according to the quantity of hydraulic fluid to be supplied to the actuators.

BRIEF DESCRIPTION OF THE DRAWINGS

The above and other objects, features and other advantages of the present invention will be more clearly understood from the following detailed description taken in conjunction with the accompanying drawings, in which:

FIG. 7 is a schematic side view of an excavator of which a bucket is automatically controlled to maintain the open upper portion thereof to be parallel with the absolute horizontal line irrespective of positional displacement of the bucket in accordance with this invention;

FIG. 8 is a partially enlarged schematic block diagram showing a control unit for controlling a bucket in accordance with this invention, comprising a select switch and a digital keyboard electrically connected to the controller of FIG. 1;

FIGS. 9 and 9a are interrelated flow diagrams of an automatic control process for surface finishing operation performed by the control unit of FIG. 8 electrically connected to the hydraulic circuit of FIG. 1;

FIG. 12 is a schematic side view of an excavator excavating the ground simultaneously with being controlled by the control unit of FIG. 11 electrically connected to the hydraulic circuit of FIG. 1;

FIG. 13 is a schematic plane view of the excavator for showing the limiting of leftward and rightward swinging angle thereof;

FIG. 18 is a graph showing the characteristic curve of variation of the quantity of hydraulic fluid flow outputted from a main hydraulic pump on the basis of the handling angle of the control levers/pedals in case of single type handling in accordance with this invention;

FIGS. 19A and 19B are graphs showing the characteristic curves of variation of the quantity of hydraulic fluid flow outputted from the main hydraulic pumps, the subject pump and the other pump, on the basis of the handling angle of the control levers/pedals in accordance with this invention;

FIG. 20 is a graph showing the characteristic curve of variation of the maximum quantity of hydraulic fluid flow outputted from the main hydraulic pumps according to the variation of load;

FIG. 23 is a graph showing the stroke movement control performed by the stroke movement control unit of FIG. 22;

DETAILED DESCRIPTION OF THE PREFERRED EMBODIMENTS

Figure 1:
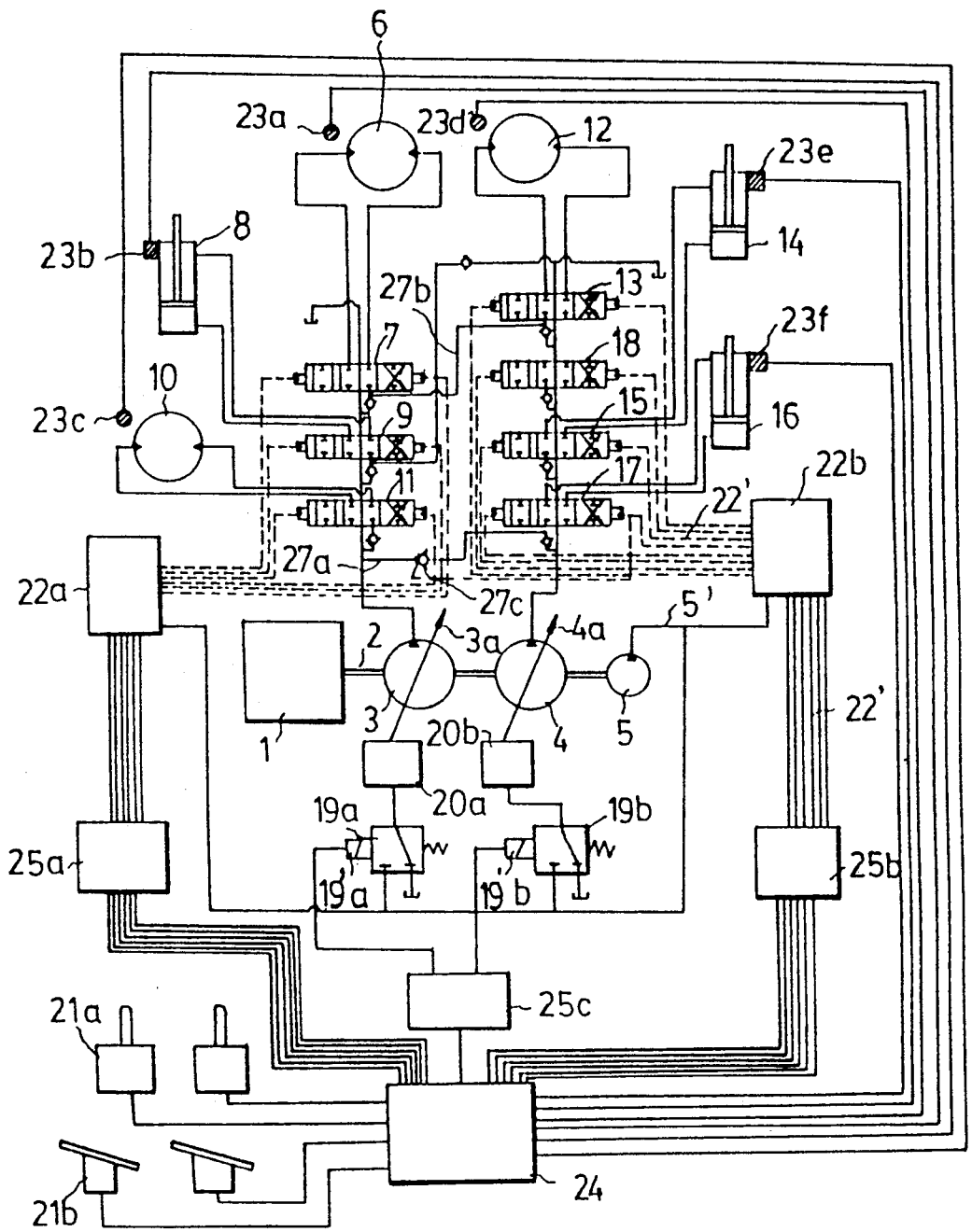
FIG. 1 is a schematic circuit diagram showing a basic hydraulic circuit of an automatic actuating system for actuators of excavator in accordance with the present invention.

Referring now to FIG. 1 which is a schematic hydraulic circuit diagram showing a basic hydraulic circuit of an automatic actuating system for actuators of excavator in accordance with the present invention, the basic hydraulic circuit is provided with an engine 1 for generating the driving power for the excavator, a pair of main hydraulic pumps which comprise a first and second hydraulic pumps 3 and 4 sequentially and straightly connected to a driving shaft 2 of the engine 1, each said pump comprising a hydraulic pump of the variable displacement type. The second pump 4 is straightly connected to a sub-hydraulic pump or a third pump 5 having a relatively smaller capacity than those of the first and second main pumps 3 and 4 and adapted for outputting a pilot hydraulic fluid.

As shown in the drawing, the first main pump 3 is straightly communicated with a first group of directional control valves, for example a first directional control valve 7 for controlling the actuating direction of a left travel motor 6 adapted for driving the left side crawler of the excavator, a second directional control valve 9 for controlling the actuating direction of a dipper cylinder 8 adapted for driving a dipper stick, and a third directional control valve 11 for controlling the actuating direction of a swing motor 10 adapted for swinging the upper frame having the cab with respect to the lower frame having the crawlers. Also, the second main pump 4 is straightly communicated with a second group of directional control valves, for example a fourth directional control valve 13 for controlling the actuating direction of a right travel motor 12 adapted for driving the right side crawler of the excavator, a fifth directional control valve 15 for controlling the actuating direction of a bucket cylinder 14 adapted for driving a bucket, a sixth directional control valve 17 for controlling the actuating direction of a boom cylinder 16 adapted for driving a boom, and a preparatory directional control valve 18 for controlling the actuating direction of an auxiliary actuator (not shown) which may be equipped in the excavator as required by the consumer.

On the other hand, the hydraulic fluid outputted from the third hydraulic pump 5 having the relatively smaller capacity than those of the first and second main pumps 3 and 4 is used as a pilot hydraulic fluid for actuating the swash plates 3a and 4a of the first and second main pumps 3 and 4 and the spool of each directional control valve 7, 9, 11, 13, 15, 17, 18. That is, a part of the pilot hydraulic fluid from the third pump 5 is communicated through a fluid passage with a pair of regulators 20a and 20b, each adapted for controlling the inclination angle of the swash plate 3a, 4a of the main pump 3, 4, by way of a pair of swash plate control valves 19a and 19b which each comprises a proportional valve provided with a solenoid 19'a, 19'b. The other part of the pilot hydraulic fluid from the third pump 5 is communicated through another fluid passage with each spool of the directional control valve 7, 9, 11, 13, 15, 17, 18 by way of a pair of electronic proportional valve blocks 22a and 22b each connected to the directional control valve 7, 9, 11, 13, 15, 17, 18 and also a controller 24 through a control line 22', and actuated under the control of the controller 24 in accordance with handling of the control levers 21 a and control pedals 21b provided in the cab.

In addition, the control levers 21a and pedals 21b comprises the same number of levers and pedals as those of the directional control valves 7, 9, 11, 13, 15, 17 and 18, that is the number of actuators 6, 8, 10, 12, 14 and 16. Also, the proportional pilot valve blocks 22a and 22b each includes therein the same number of proportional pilot valves (not shown) as those of a group of directional control valves 7, 9 and 11 or 13, 15, 17 and 18 connected to the corresponding valve block 22a, 22b. Therefore, a control lever/pedal 21a, 21b, corresponding to an actuator which is to be actuated, is handled in order to proportionally drive a proportional pilot valve provided in the valve block 22a, 22b, said proportional pilot valve corresponding to the handled control lever/pedal 21a, 21b, so that the pilot hydraulic fluid from the third pump 5 is supplied to a directional control valve 7, 9, 11, 13, 15, 17, 18 corresponding to the actuator which is to be actuated. Hence, the spool of the directional control valve 7, 9, 11, 13, 15, 17, 18 supplied with the pilot hydraulic fluid from the third pump 5 moves rightwards or leftwards in order to last actuate the operating members, such as the bucket, the dipper stick or the like, in a desired direction as requested.

As shown in FIG. 1, the hydraulic circuit is additionally provided with a plurality of sensors 23a to 23f for sensing positional displacement of the actuators 6, 8, 10, 12, 14 and 16 generated according to the actuation for the actuators. The sensors 23a to 23f are mounted to the actuators, respectively. Thus, the sensors comprise the same number of sensors as that of the actuators. Also, the sensors 23a to 23f is electrically connected to the controller 24 so as to output a signal representing the displacement of the corresponding actuator to the controller 24.

On the other hand, a pair of amplifiers 25a and 25b each is electrically connected to the pilot proportional valve block 22a, 22b and the controller 24 so as to be disposed therebetween, while another amplifier 25c is electrically connected to the swash plate control valves 19a and 19b and the controller 24 so as to be disposed therebetween. The controller 24 is electrically connected to the positional displacement sensor 23a to 23f.

The positional displacement sensors 23a to 23f may comprise several types of known sensors. For example, the sensors 23b, 23e and 23f mounted to the dipper cylinder 8, the bucket cylinder 14 and the boom cylinder 16, respectively, each may comprise a sensor which comprises a variable resistance potential meter and magnetic materials so as to output an electric signal resulting from counting the number of magnetic materials. In the same manner, the sensor 23c of the swing motor 10 may comprise an absolute type encoder capable of sensing the absolute position of the upper frame with respect to the lower frame of the excavator, while the sensors 23a and 23d mounted to the travel motors 6 and 12 each may comprise an incremental encoder.

Also, each amplifier 25a, 25b, 25c, electrically connected to the output port of the controller 24, is adapted for amplifying the signal of control value calculated in the controller 24 and outputting the amplified signal to the pilot valve block 22a, 22b or the swash plate control valves 19a and 19b. In other words, electric current generated in accordance with the handling displacement value of the control levers/pedals 21a and 21b is applied to the controller 24 in order to be calculated thereby, and amplified in the amplifiers 25a and 25b each disposed between the controller and the pilot valve blocks 22a and 22b, and then applied to the valve blocks 22a and 22b so as to control the quantity of pilot hydraulic fluid outpointed from the third hydraulic pump 5 to the spools of respective directional control valves 7, 9, 11, 13, 15, 17 and 18. Also, the sensors 23a to 23f each outputs a signal representing the positional displacement value of each actuator 6, 8, 10, 12, 14, 16 sensed thereby to the controller 24 so that the controller 24 calculates the signals of positional displacements of the actuators, outputted from the sensors 23a to 23f thereto, on the basis of the load on the actuators and the required quantity of hydraulic fluid flow for the actuators so as to adjustably control the first and second main pumps 3 and 4, thereby allowing the first and second main pumps 3 and 4 to equally charge a load in case of occurrence of an overload.

In accordance with the present invention, the controller 24 of the basic hydraulic circuit shown in FIG. 1 is provided with another control elements in order to automatically and efficiently carry out a control led actuation for each actuator of the excavator, as described hereinafter.

Figure 2:
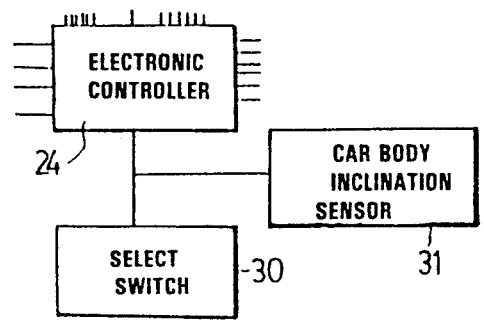
FIG. 2 is a partially enlarged schematic block diagram showing a control unit for controlling a bucket in accordance with this invention, comprising a select switch and a car body gradient sensor electrically connected to the controller of FIG. 1.

FIG. 2 shows a control unit comprising the controller 24 which is electrically connected to a select switch 30 and car body inclination sensor 31 in order to automatically control an overloaded bucket to be free from the overloaded state thereof. The select switch 30 is adapted for selecting whether the handling for making the overloaded bucket be free from the overloaded state is manually or automatically performed. Also, the sensor 31 is adapted for sensing the inclination angle of the car body of the excavator on the basis of the absolute coordinates thereof.

The control unit of FIG. 2 in cooperation with the hydraulic circuit of FIG. 1 automatically controls the actuators in order to make the overloaded bucket be free from the overloaded state, as follows.

First, the engine 1 drives in order to cause the first and second main pumps 3 and 4 and the third hydraulic pump 5 to be driven. Also, the operator inside the cab of the excavator turns on or turns off the select switch in order to accomplish the selection whether control for making the overloaded bucket be free from the overloaded state is manually or automatically performed, and thereafter manually handles the control levers/pedals 21a and 21b as he demands, thereby causing the controller 24 to output an electric signal to the amplifiers 25a to 25c. At this time, the third amplifier 25c, connected to the swash plate control valves 19a and 19b of the main pumps 3 and 4, amplifies the electric signal from the controller 24 in order to allow the solenoids 19'a and 19'b of the swash plate control valves 19a and 19b to be magnetized. Thus, the pilot hydraulic fluid from the third pump 5 is supplied to the swash plate control valves 19a and 19b through a sub-hydraulic line 5' in order to vary the inclination angles of the swash plates 20a and 20b of the main pumps 3 and 4, thereby accomplishing the desired control For the quantity of hydraulic fluid flow of each main pump 3, 4. At the same time, the first and second amplifiers 25a and 25b, each connected to the pilot valve block 22a, 22b, amplify the electric signal outputted from the controller 24 in order to drive the pilot valve blocks 22a and 22b. Thus, the pilot hydraulic fluid from the third pump 5 is supplied to the spools of the directional control valves 7, 9, 11, 13, 15, 17 and 18 for respective actuators, thereby causing the control valves 7, 9, 11 13, 15, 17 and 18 to be directionally controlled.

In result, the hydraulic fluid provided by the first and second main hydraulic pumps 3 and 4 is supplied to the actuators 6, 8, 10, 12, 14 and 16 by way of the control valves 7, 9, 11, 13, 15, 17 and 1 8 in order to actuate the actuators as demanded, thereby accomplishing a desired operation of the excavator.

However, during a desired operation using the bucket of the excavator, especially an excavating operation, the bucket may be caught on a heavy material, such as a heavy rock, resulting in making the bucket be in the overloaded state and causing the car body to be shaken. In this case, the overloaded bucket is manually or automatically controlled in order to be free from the overloaded state thereof and then actuated to continuously carry out the desired operation in accordance with this invention. That is to say, the overloaded bucket can be manually controlled in order to be free from the overloaded state as the select switch 30 is turned off, while the bucket is automatically controlled as the select switch 30 is turned on.

Figure 3:
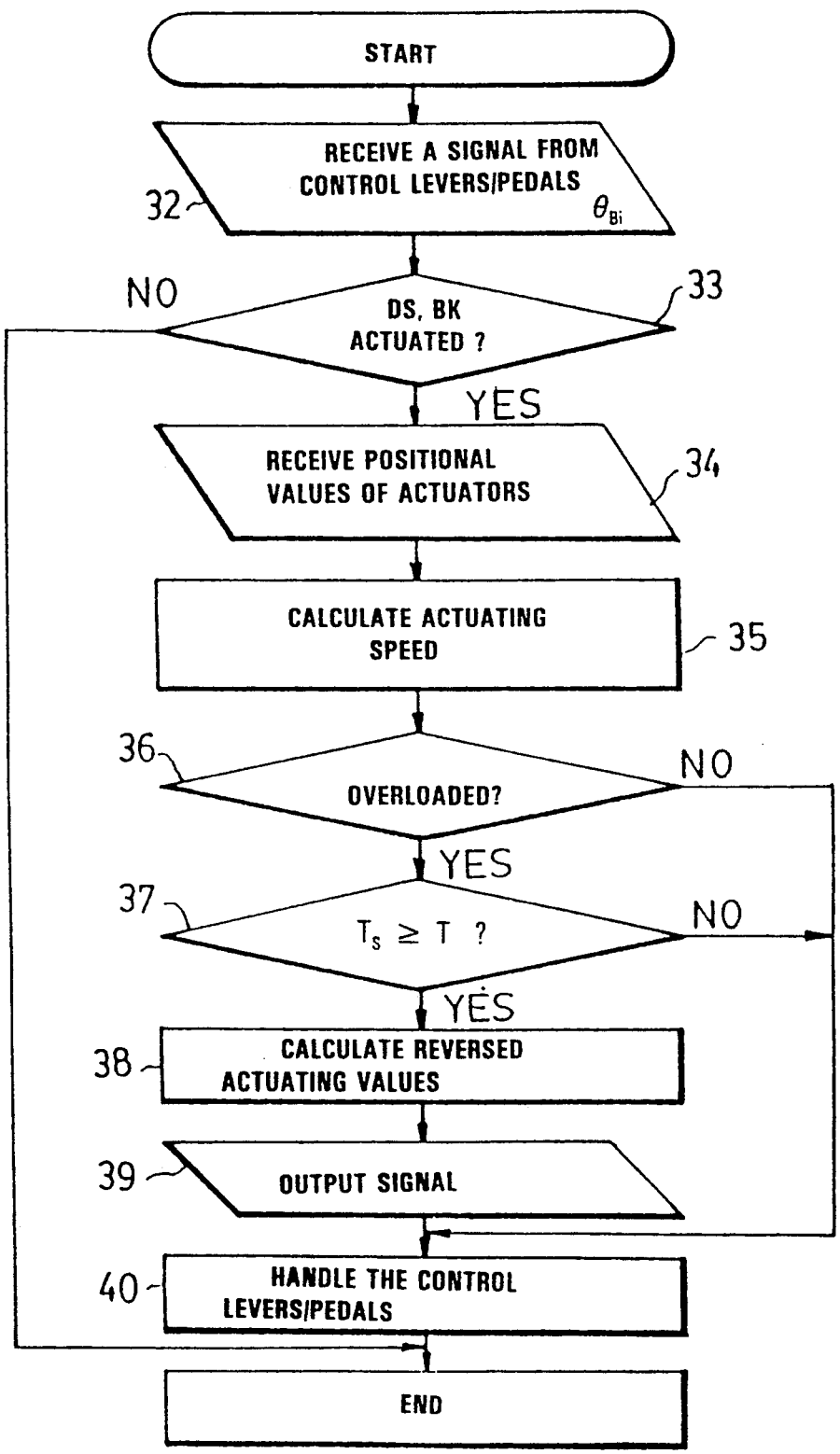
FIG. 3 is a flow diagram of an automatic control process for controlling the overloaded bucket performed by the control unit of FIG. 2 electrically connected to the hydraulic circuit of FIG. 1.

Turning next to the flow diagram of FIG. 3 showing the automatic control process for the overloaded bucket performed by the control unit of FIG. 2 cooperating with the hydraulic circuit of FIG. 1, the controller 24 first receives an electric signal from the control lever 21a at a step 32 in accordance with handling thereof. Thereafter, at a next inquiry step 33 it is determined whether the bucket 28 and the dipper stick 29 are now actuated. If the answer is yes, the controller 24 performs a step 34, while the process ends if the answer is no. At the step 34, the controller 24 counts The number of the pulses outputted from the sensors 23b, 23e and 23f of the dipper cylinder 8, the bucket cylinder 14 and the boom cylinder 16 thereto, and then multiplies the number of the pulses by magnetic intervals in order to calculate the present positional value of the bucket 28, thereby accomplishing the receiving of the present positional value of the bucket 28.

The controller 24 at a next step 35 divides the result positional value of the bucket, 28, obtained at the step 34, by the required time so as to calculate the actuating speed of the bucket 28. The process then proceeds to a next inquiry step 36 wherein it is determined whether the bucket 28 is caught on an overload on the basis of the speed of the bucket. That is, at the step 36 it is determined whether the moving speed of the bucket 28 is within a predetermined range of 0.5 cm/sec-2 cm/sec.

If the moving speed of the bucket 28 is within the predetermined range, the process proceeds to a step 37. However, if the moving speed of the bucket is over than the predetermined speed range, the bucket is considered to be actuated in a formal condition so that the process simply proceeds to the end step in order to be ended.

At the step 37, it is determined whether the overloaded state is continued for a time over than 3 sec (referred to a basic time "Ts" in the drawing). If the answer is yes, the bucket is considered to be in the overloaded state so that the controller performs a next step 38 wherein the bucket is automatically controlled to move in opposite direction in a distance. However the answer is no, the bucket 28 is considered to be temporarily caught on the overload during the operation so that the process simply proceeds to the end step in order to continue the excavating operation.

Figure 4:
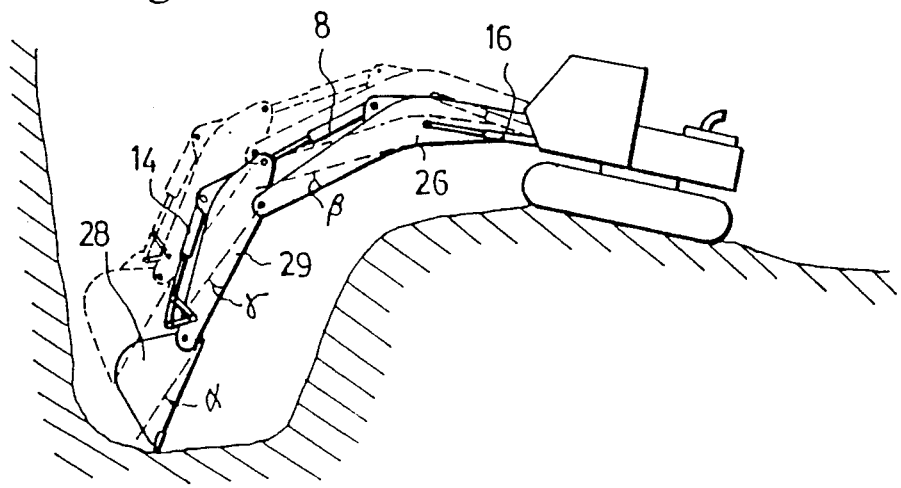
FIG. 4 is a schematic side view of an excavator of which the overloaded bucket is automatically actuated to be free from the overloaded state thereon in accordance with this invention.

At the step 38, the overloaded bucket 28, of which moving speed within the reference speed of 0.5 cm/sec-2 cm/sec is continued for a time over than 3 sec (Ts), is automatically controlled to move in backward direction, opposite to the excavating direction of the bucket 28, at an angle ($\alpha$ of FIG. 4) and then move up to a height. In other words, at the step 38 it is calculated a time required for controlling the control valve 15 of the bucket cylinder 14 to change the actuating direction of the valve 15 to the opposite direction in order to allow the bucket to be turned at an angle $\alpha$, for example 4°-8°, in the direction opposite to the excavating direction. Also, it is calculated at the step 38 a time required for controlling the control valve 17 of the boom cylinder 16 to change the actuating direction of the valve 17 to the opposite direction in order to allow the boom to be turned at an angle $\beta$, for example 1°-3°, in the direction opposite to the excavating direction. Additionally, the controller 24 calculates at the step 38 a time required for controlling the control valve 9 of the dipper cylinder 8 to change the actuating direction of the valve 9 to the opposite direction in order to allow the dipper stick to be turtled at an angle $\Gamma$, for example 2°-5°, in the direction opposite to the excavating direction.

Thereafter, the process proceeds to a next step 39 wherein the calculated values resulting from the step 38 are outputted in the form of electric signal to the first and second amplifiers 25a and 25b and the pilot valve blocks 22a and 22b so that the valve blocks 22a and 22b are driven. Thus, the pilot hydraulic fluid from the third hydraulic pump 5 is allowed to be supplied to the directional control valves 9, 15 and 17 of the actuating cylinders 8, 14 and 16 through the pilot hydraulic line 22', thereby allowing the boom 26, the bucket 28 and the dipper stick 29 to be automatically displaced in desired extent.

At last, the control levers 21a are manually handled by the operator at a step 40 so that the boom 26, the bucket 28 and the dipper stick 29 are controlled in order to continue the desired operation of the excavator without an overload.

On the other hand, even though the flow diagram of FIG. 3 shows one cycle of the automatic control process for the overloaded bucket during the excavating operation of the excavator, the process will be returned to the start step in order to again carry out the control process as the bucket 28 having been free from the overloaded state through the above mentioned process is caught on another overload.

Also, it was so described in the above description that the turning angles $\alpha$, $\beta$ and $\Gamma$ for the bucket 28, the boom 26 and the dipper stick 29 which are set in the controller 24 are ranged at specified ranges, such as 4°-8°, 1°-3° and 2°-5° for respective angles. However, the range of the turning angles α, β and Γ are able to be changed in accordance with the working condition of the excavating operation and reset in the controller 24.

The control unit, shown in FIG. 2 and comprising the controller 24 which is electrically connected to a select switch 30 and car body gradient sensor 31, additionally controls the loaded bucket 28 to be always automatically maintained at a desired positional angle, at which angle the objects contained in the bucket are prevented from being dropped, with respect to the absolute horizontal line irrespective of movement of actuators 6, 8, 10, 12 and 16 except for the bucket cylinder 14.

The control process for maintaining the positional angle of the loaded bucket with respect to the absolute horizontal line irrespective of the movement of the excavator will be performed as described hereinafter in conjunction with FIGS. 5 to 7.

Figure 6A:
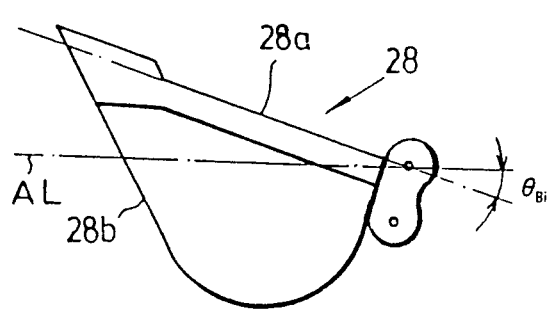
FIGS. 6A and 6B are side views of the bucket for showing the positioning angles of the bucket with respect to the absolute horizontal line, respectively.
Figure 6B:
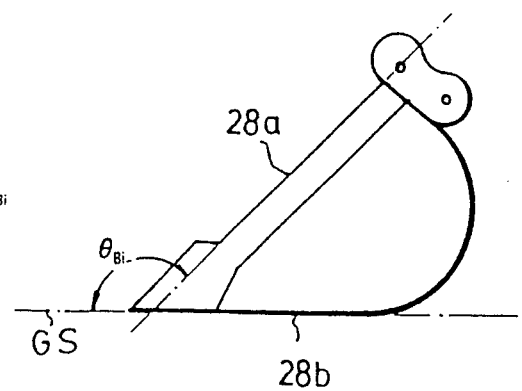
Figure 5:
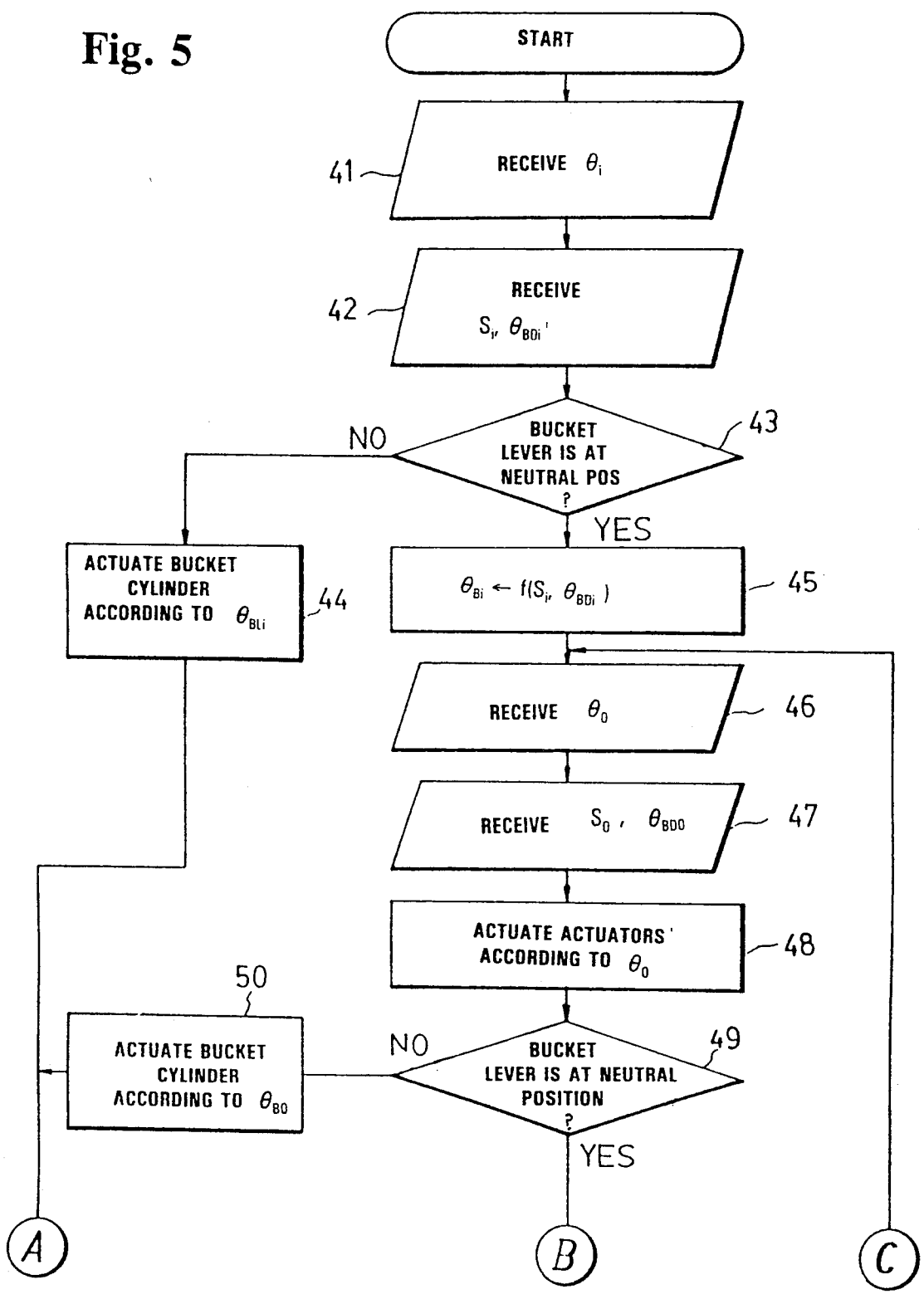
FIGS. 5 and 5a are interrelated flow diagrams of an automatic control process for maintaining the bucket to be parallel or positioned at an angle to the absolute horizontal line, which process is performed by the control unit of FIG. 2 electrically connected to the hydraulic circuit of FIG. 1.
Figure 5A:
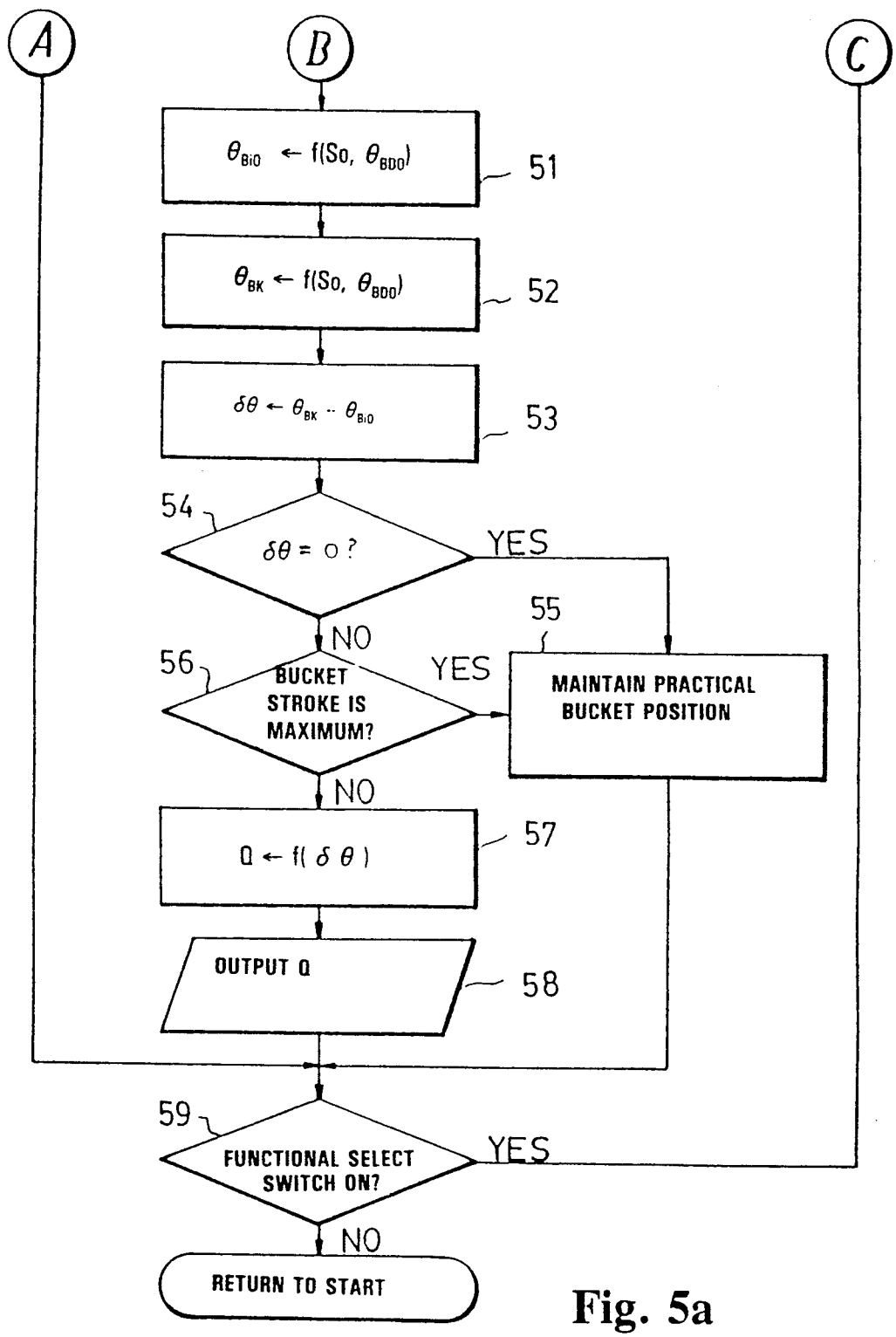

FIGS. 5 and 5a show a continued flow diagram representing the control process, for maintaining the positional angle of the loaded bucket with respect to the absolute horizontal line, performed by the control unit of FIG. 2 in cooperation with the hydraulic circuit of FIG. 1, and FIGS. 6A and 6B show several positional angles of the bucket 28 during an operation thereof. As shown in the drawings, the control process for maintaining the positional angle of the loaded bucket 28 starts at a start step and proceeds to a initial step 41 wherein the controller 24 receives operating values for respective actuators 6, 8, 10, 12, 14 and 16 from the control levers/pedals 21a and 21b. Thereafter, the process simply proceeds to a step 42 wherein the controller 24 receives respective actuating positional values Si of the actuators 6, 8, 10, 12, 14 and 16 from respective sensors 23a to 23f thereof and also an inclination angle $\Theta_{BDi}$ of the car frame with respect to the ground surface which is practically excavated from the car frame inclination angle sensor 31 in order to store therein.

Upon accomplishing the step 42, the process simply proceeds to a inquiry step 43 wherein it is determined whether the bucket lever of the control lever 21a is positioned at the neutral position. If the bucket lever is not positioned at the neutral position) it is considered that the bucket 28 is now operated so that the process proceeds to a step 44 wherein the controller 24 outputs a control signal which controls the bucket cylinder 14 to be actuated in accordance with the operating value $\Theta_{BLi}$ of the bucket lever, and then the process simply proceeds to a step 59. However, if the bucket lever is positioned at the neutral position, the process sequentially proceeds to steps 45 to 59 in order to allow the loaded bucket 28 to be automatically controlled so that the desired positional angle of the bucket 28 with respect to the absolute horizontal line.

At the step 45, an initial positional angle $\Theta_{Bi}$ of the bucket 28 with respect to the absolute horizontal line is calculated by using the respective actuating positional values Si of the actuators 6, 8, 10, 12 and 16 except for the positional value Si of the bucket cylinder 14 and also the inclination angle $\Theta_{BDi}$ of the car frame with respect to the ground surface.

Here, the initial positional angle $\theta_{Bi}$ of the bucket 28 denotes an inclination angle of the bucket 28 with respect to the absolute horizontal line as the bucket lever is positioned at the neutral position 28 during the operation of the excavator, such as the excavating operation, in order to stop operating the bucket 28.

Additionally, the initial positional angle $\theta_{Bi}$ of the bucket 28 will be more detailedly described in conjunction with FIGS. 6 and FIG. 7 which is a schematic side view of the excavator of which the bucket is automatically actuated to allow the open portion thereof to be parallel with the absolute horizontal line AL irrespective of positional displacement thereof. In the excavating operation of the excavator for the ground as shown in FIG. 6A, the operator inside the cab handles the bucket lever in order to control the bucket cylinder 14 to sequentially actuate the bucket 28 to excavate soil and contain the excavated soil therein and also have an inclination angle thereof, such as 0°-5° with respect to the absolute horizontal line. Thereafter, the operator places the bucket lever at the neutral position. At this time, the controller 24 of the control unit calculates the initial positional angle $\theta_{Bi}$ of the bucket 28 with respect to the absolute horizontal line, that is the inclination angle of the bucket, by using the respective actuating positional values Si of the actuators 6, 8, 10, 12 and 16 except for the positional value Si of the bucket cylinder 14 and also the inclination angle $\theta_{BDi}$ of the car frame of the excavator with respect to the ground surface.

On the other hand in case of a land readjusting operation as shown in FIG. 6B, the operator handles the bucket lever in order to control the bottom of the bucket 28 to closely contact with the ground surface GS, and then he places the bucket lever at the neutral position in order to stop operating the bucket 28. At this time, an angle of the open upper portion of the bucket 28 with respect to the ground surface which is to be adjusted is about 135°, that is the initial positional angle $\theta_{Bi}$ of the bucket 28 with respect to the ground surface, can be calculated by using the respective actuating positional values Si of the actuators 6, 8, 10, 12 and 16 except for the positional value Si of the bucket cylinder 14 and also the inclination angle $\Theta_{BDi}$ of the car frame of the excavator with respect to the ground surface.

Turning again to the flow diagram of FIG. 5, upon accomplishing the step 45, the process proceeds to a step 46 wherein the controller 24 receives the operating values $\Theta_0$ for the actuators 6, 8, 10, 1 2, 14 and 16 from the control levers/pedals 21a and 21b. Thereafter, the process simply proceeds to a step 47 wherein the controller 24 receives respective actuating positional values $S_0$ of the actuators 6, 8, 10, 12, 14 and 16 from the sensors 23a to 23d and 23f thereof and also an inclination angle $\Theta_{BDo}$ of the car frame with respect to the ground surface which is practically excavated from the car frame inclination angle sensor 31.

At a next step 48, the actuators 6, 8, 10, 12, and 16 except for the bucket cylinder 14 are controlled to be actuated in accordance with the operating values $\Theta_0$, and then the process proceeds to a inquiry step 49 wherein it is determined whether the bucket lever is positioned at the neutral position. If the bucket lever is not positioned at the neutral position, the bucket is considered to be operated so that the process proceeds to a step 50 wherein the bucket cylinder 14 is controlled to be actuated in accordance with the operating value $\Theta_{B0}$ for the bucket cylinder 14 having received at the step 46. However, if the bucket lever is positioned at the neutral position, the process proceeds to a step 51 shown in FIG. 5B wherein an initial positional angle $\Theta_{BiO}$ of the bucket 28 is reset as calculated by using the respective actuating positional values $S_0$ of the actuators 6, 8, 10, 12 and 16 except for the positional value $S_0$ of the bucket cylinder 14 and also the inclination angle $\Theta_{BDO}$ of the car frame of the excavator with respect to the ground surface.

Here, the reason why the initial positional angle $\Theta_{BiO}$ of the bucket 28 must be reset is that the initial positional angle $\Theta_{Bi}$ calculated at the step 45 might be changed at a step after the step 45 by virtue of an actuation of the bucket 28. Thus, if the bucket 28 was not again actuated, the initial positional angle $\Theta_{BiO}$ of the bucket 28 will be equal to the initial positional angle $\Theta_{Bi}$ calculated at the step 45.

Sequentially at a step 52, it is calculated a practical angle $\Theta_{BK}$ of the bucket 28 on the basis of the absolute horizontal line of the ground which may be varied in accordance with the movement of the excavator resulting from the actuation of the actuators 6, 8, 10, 12 and 16. The practical angle $\Theta_{BK}$ of the bucket 28 on the basis of the absolute horizontal line of the ground can be calculated in the same manner as that of the step 45 by using the respective actuating positional values $S_O$ of the actuators 6, 8, 10, 12 and 16 except for the positional value $S_O$ of the bucket cylinder 14 and also the inclination angle $\Theta_{BDO}$ of the car frame of the excavator with respect to the ground surface. Thereafter, the process simply proceeds to a step 53 wherein a difference 60 between the initial positional angle $\Theta_{BiO}$ of the bucket 28 calculated at the step 51 and the practical angle $\Theta_{BK}$ of the bucket 28 calculated at the step 52.

Thereafter at a next inquiry step 54 wherein it is determined whether the difference 60 is zero, that is, the initial positional angle $\Theta_{BiO}$ of the bucket 28 calculated at the step 51 is equal to the practical angle $\Theta_{BK}$ of the bucket 28 calculated at the step 52.

In other words, the operator handles the control levers/pedals 21a and 21b so that the bucket 28 excavates the ground and contains the excavated soil and then places the bucket lever at the neutral position in order to stop actuating the bucket 28. Thereafter, the control levers/pedals 21a and 21b in order to actuate the boom 26 or the dipper stick 29 without actuating the bucket 28. At this time, the practical positional angle of the bucket may be gradually varied with absolute horizontal line in accordance with the movements of the actuating members, such as the boom 26, the dipper stick 29, the travelling members and the like.

If the difference $\delta\Theta$ is zero, that is the practical angle $\Theta_{BK}$ of the bucket 28 is equal to the initial positional angle $\Theta_{BiO}$ of the bucket 28, the process proceeds to a next step 55 wherein the bucket 28 is controlled to be maintained at the present position and simply proceeds to the step 59. However, if the difference 60 is not zero, that is the practical angle $\Theta_{BK}$ of the bucket 28 is not equal to the initial positional angle $\Theta_{BiO}$ of the bucket 28 so that the initial positional angle of the bucket 28 is considered to be varied by virtue of the movement of the operating members except for the bucket 28, the process proceeds to a next inquiry steps 56 to 59 wherein the bucket 28 is so controlled that the practical angle $\Theta_{BK}$ of the bucket 28 is equal to the initial positional angle $\Theta_{BiO}$ of the bucket 28.

At the step 56, it is determined whether the stroke of the bucket 28 is maximum stroke. If the stroke of the bucket 28 is the maximum stroke, the position of the bucket 28 is considered not to be controlled so that the process proceeds to the step 55. However, if the stroke of the bucket 28 is not the maximum stroke, the proceeds to the next step 57 wherein a control value Q for the bucket 28 in accordance with the difference $\delta\Theta$ is calculated. Thereafter at the step 58, the control value Q is outputted to the bucket cylinder 14 in order to equalize the practical angle $\Theta_{BK}$ of the bucket 28 to the initial positional angle $\Theta_{BiO}$ of the bucket 28. At the step 59, it is determined whether the select switch 30 of the control unit is turned on. If the switch 30 is turned on, the process returns to the step 46, while if the switch is turned off, the process returns to the start step.

The actuating system of this invention can automatically control the surface finishing operation of the excavator. To accomplish the control system for controlling the surface finishing operation, the controller 24 of hydraulic circuit of FIG. 1 is electrically connected to the select switch 30 and a rotary switch or a digital keyboard 60 as shown in FIG. 8.

Figure 9A:
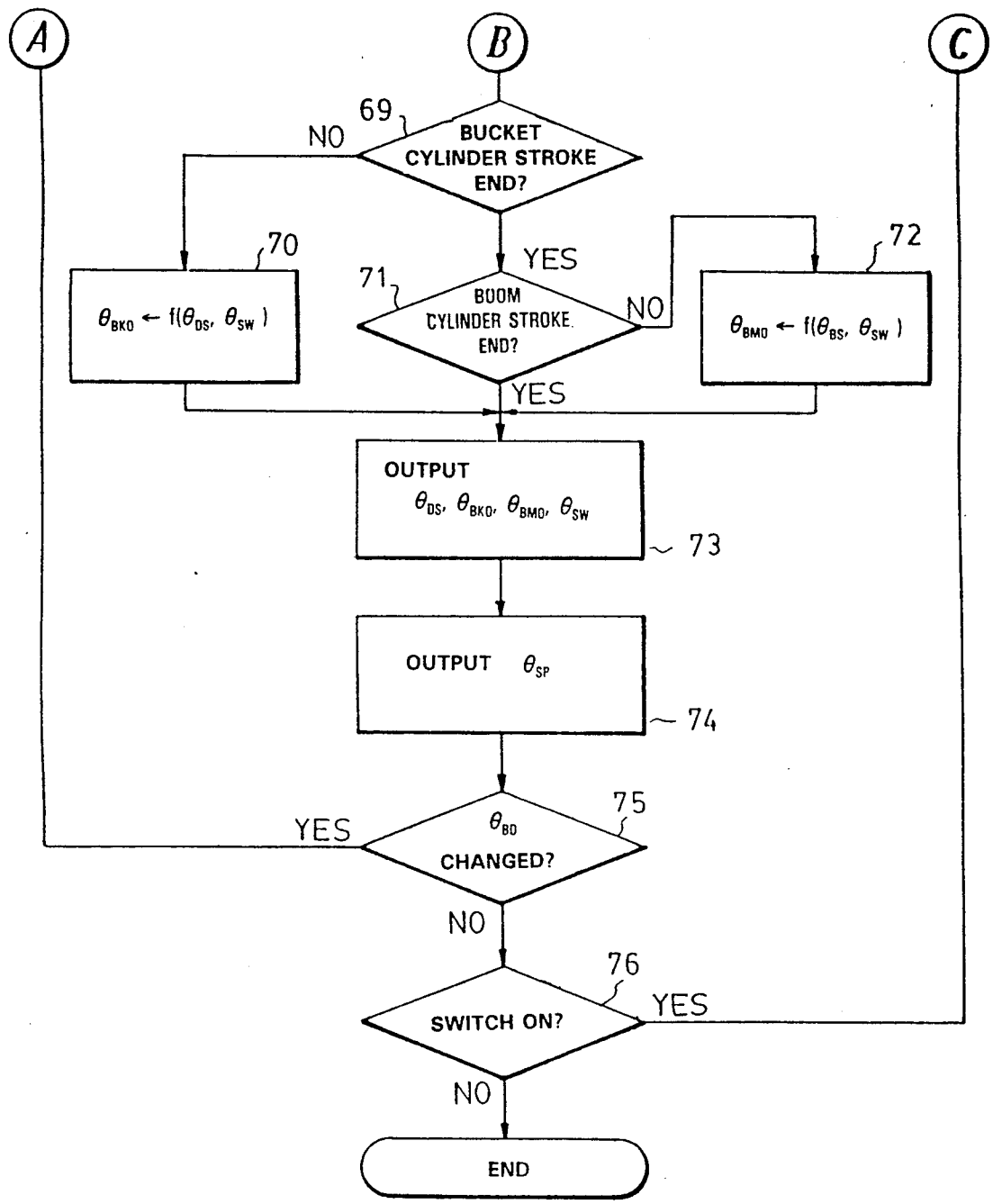

The system of FIG. 8 performs a control process for the surface finishing operation as described in a flow diagram of FIGS. 9 and 9a.

Figure 10:
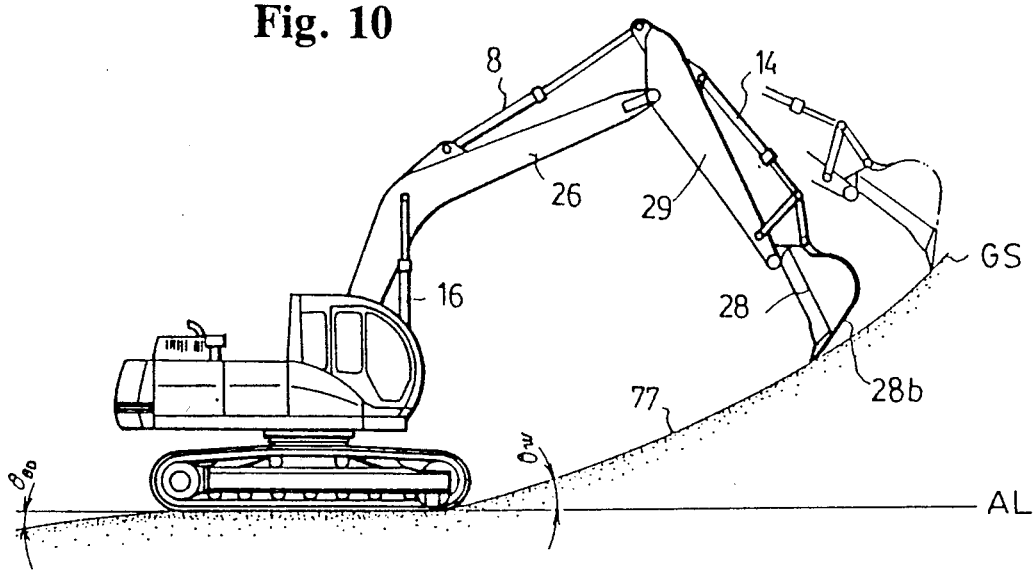
FIG. 10 is a schematic side view of an excavator for showing how the positions of the operating members are set with respect to the ground surface in order to automatic control the surface finishing operation in accordance with this invention.

FIGS. 9, 9a and 10 are a flow diagram carrying out an automatic control for surface finishing operation, and a schematic side view of the excavator for showing how the positions of the operating members are set with respect to the ground surface, respectively. According to the flow diagram of FIGS. 9 and 9a, the actuators 6, 8, 10, 12, 14 and 16 are controlled so that the front tip or the bottom of the bucket 28 closely contacts with the ground surface which is to be adjusted by the excavator as shown in FIG. 10, thereby accomplishing the setting of the position and the direction of the ground surface which is to be adjusted. Thereafter, the process proceeds to a step 62 wherein under the condition that the front tip or the bottom of the bucket 28 closely contacts with the ground surface GS which is to be adjusted as shown in FIG. 10, an inclination angle $\Theta_{BD}$ of the car frame of the excavator with respect to the absolute horizontal line and the positional values of the actuators 6, 8, 10, 12, 14 and 16 are received by the controller 24. Then, at a step 63, an inclination angle $\Theta_W$ of the ground surface GS with respect to the absolute horizontal line is received by the controller 24, said inclination angle $\Theta_W$ having been set by the operator by using the digital keyboard 60. Thereafter, the process proceeds to a step 64 wherein an inclination angle $\Theta'_W$ of the ground surface with respect to the excavator frame is calculated. At this time, the angle $\Theta'_W$ is equal to the difference between the inclination angle $\Theta_W$ of the ground surface GS with respect to the absolute horizontal line and the inclination angle $\Theta_{BD}$ of the excavator with respect to the absolute horizontal line, that is $\Theta'_W \Theta_W - \Theta_{BD}$.

Thereafter, the process proceeds to a step 65 wherein operating values $\Theta_i$ by the control levers/pedals 21a and 21b for the actuators 6, 8, 10, 12, 14 and 16 are received by the controller 24. At a next inquiry step 66, it is determined whether the operating value $\Theta_{DS}$ for the dipper cylinder 8 is zero. If the operating value $\Theta_{OS}$ for the dipper cylinder 8 is zero, the dipper cylinder 8 is considered not to be actuated so that the process proceeds to a step 67 wherein the operating values $\Theta_i$ for the actuators 6, 10, 12, 14 and 16 having been received at the step 65 are outputted from the controller 24 to the directional control valves 7, 11, 13, 15 and 17 by way of the pilot valve blocks 22a and 22b in order to actuate the actuators 6, 10, 12, 14 and 16 in accordance with the operating values. However, if the operating value $\Theta_{DS}$ for the dipper cylinder 8 is not zero, the process proceeds to a step 68 wherein it is determined whether the stroke of the dipper cylinder 8 ends, that is it is determined whether the dipper cylinder 8 advances to the maximum extent. If the dipper cylinder 8 advances to the maximum extent, the process proceeds to the step 67 wherein the operating values for the actuators 6,10, 12, 14 and 16 having been received at the step 65 are outputted from the controller 24 to the directional control valves 7, 11 , 13, 15 and 17 by way of the pilot valve blocks 22a and 22b in order to actuate the actuators 6, 10, 12, 14 and 16 in accordance with the operating values. However, if the dipper cylinder 8 does not advance to the maximum extent, the process proceeds to a step 69.

At the step 69, it is determined whether the stroke of the bucket cylinder 14 ends, that is it is determined whether the bucket cylinder 14 advances to the maximum extent. If the bucket cylinder 14 does not advance to the maximum extent, the process proceeds to a step 70 wherein a compensated operating value $\Theta_{BKO}$ for the bucket cylinder 14 is calculated by functional operation of the operating values $\Theta_{DS}$ and $\Theta_{SW}$ for the dipper cylinder 8 and the swing motor 10. If the dipper cylinder 8 or the swing motor 10 is actuated under condition that the front tip or the bottom of the bucket 28 closely contacts with the ground surface which is to be adjusted as shown in FIG. 10, the front tip or the bottom of the bucket 28 will be gradually separated from the ground surface as the dipper cylinder 8 and the swing motor 10 are actuated so that it needs to calculate the compensated operating value $\Theta_{BKO}$ for the bucket cylinder 14. The compensated operating value $\Theta_{BKO}$ for the bucket cylinder 14 can be calculated by functional operation of the operating values $\Theta_{DS}$ and $\Theta_{SW}$ for the dipper cylinder 8 and the swing motor 10, that is $\Theta_{BKO} \leftarrow f(\Theta_{DS}, \Theta_{SW})$. Then, the process proceeds to a step 73. However, if the bucket cylinder 14 advances to the maximum extent, the process proceeds to a next inquiry step 71 wherein it is determined whether the stroke of the boom cylinder 16 ends, that is it is determined whether the boom cylinder 16 advances to the maximum extent.

If the boom cylinder 16 does not advance to the maximum extent, the process proceeds to a step 72 wherein a compensated operating value $\Theta_{BMO}$ for the boom cylinder 16 is calculated by functional operation of the operating values $\Theta_{DS}$ and $\Theta_{SW}$ for the dipper cylinder 8 and the swing motor 10 if the dipper cylinder 8 or the swing motor 10 is actuated under condition that the boom 26 is controlled so as to allow the front tip or the bottom of the bucket 28 to closely contact with the ground surface which is to be adjusted, the boom 26 will be displaced as the dipper cylinder 8 and the swing motor 10 are actuated, thereby causing the front tip or the bottom of the bucket 28 to be gradually separated from the ground surface. Thus, it needs to calculate the compensated operating value $\Theta_{BMO}$ for the boom cylinder 16. The compensated operating value $\Theta_{BMO}$ for the boom cylinder 16 can be calculated by functional operation of the operating values $\Theta_{DS}$ and $\Theta_{SW}$ for the dipper cylinder 8 and the swing motor 10, that is $\Theta_{BMO} \leftarrow f(\Theta_{DS}, \Theta_{SW})$. Then, the process proceeds to the step 73.

On the other hand, if the boom cylinder 16 advances to the maximum extent, the process simply proceeds to the step 73. At the step 73, the operating values $\Theta_{DS}$ and $\Theta_{SW}$ for the dipper cylinder 8 and the swing motor 10 are outputted to the cylinders 8 and 10 simultaneously with outputting the compensated operating values $\Theta_{BKO}$ and $\Theta_{BMO}$ for the bucket cylinder 14 and the boom cylinder 16. Thus, the bucket 28 is controlled so as to allow the front tip or the bottom thereof not to separate from the ground surface as the dipper cylinder 8 and the swing motor 10 are actuated. Thereafter, the process simply proceeds to a step 74 wherein the operating values $\Theta_{SP}$ for the left and right travel motors 6 and 12 are outputted to the motors 6 and 12 in order to actuate the motors 6 and 12, thereby allowing the excavator to travel as desired.

Also at a step 75, it is determined whether the inclination angle $\Theta_{BD}$ of the car frame of the excavator with respect to the absolute horizontal line varies as the travel motors 6 and 12 are actuated. If the inclination angle $\Theta_{BD}$ of the car frame varies, the process returns to the step 64 wherein the inclination angle $\Theta'_W$ of the ground surface with respect to the car frame is reset corresponding to tile variation of the inclination angle $\Theta_{BD}$ of the car frame. However, if the inclination angle $\Theta_{BD}$ of the car frame does not vary, the process proceeds to a next inquiry step 76 wherein it is determined whether the select switch 30 is turned on. If the switch is turned on, the process returns to the step 65, thereby controlling the bucket cylinder 14 and the boom cylinder 16 so as to operate ttie automatic surface finishing operation by means of the operation of tile dipper cylinder 8 or the swing motor 10 in accordance with the control process for the surface finishing operation as described above. However, if the switch is turned off, the process proceeds to the end step, thereby ending the control process.

Figure 11:
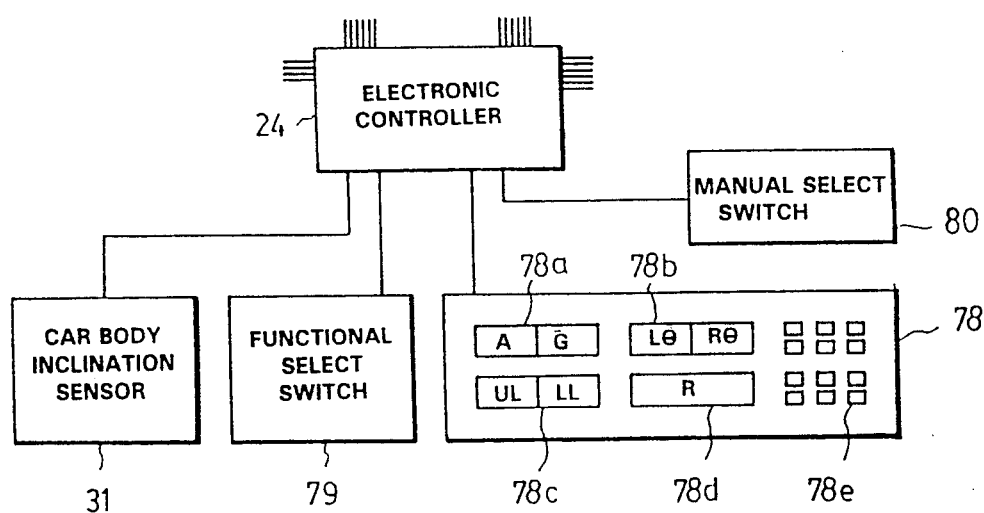
FIG. 11 is a partially enlarged schematic block diagram showing a control unit for automatic limiting the actuating range of the actuators in accordance with this invention, comprising the sensor for the inclination angle of the car frame, a functional select panel, a functional select switch and a manual switch electrically connected to the controller of FIG. 1.

Referring next to FIGS. 11 to 15, the automatic actuating system of this invention can automatically control the actuators 6, 8, 10, 127 14 and 16 to limit the actuating range thereof so that the operating range of the operating members, such as the boom 26, the bucket 28. the dipper stick 29, the swing member and the like are limited, thereby causing a safety accident to be efficiently prevented. As shown in FIG. 11 which is a partially enlarged schematic control circuit diagram of control unit for performing the control process for limiting the actuating range ()f the actuators 6, 8, 10, 12, 14 and 16 of the excavator, the control unit comprises the controller 24 of FIG. 1 electrically connected in parallel to the sensor 31 for the inclination angle of the car frame, a functional select panel 78, a functional select switch 79 and a manual switch 80. The functional select panel 78 is adapted for selecting the actuating ranges of the actuators in order to limit the operating ranges of the operating members, such as the uppermost extent, the lowermost extent, the leftmost extent and the rightmost extent of the operating members. The functional select switch 79 is adapted for turning on or turning off the selection of the functions of the functional select panel 7B, while the manual switch 80 is adapted for selecting whether the functional selection is set or released.

FIG. 12 is a schematic side view of the excavator for showing the limitation of the uppermost and lowermost operating lines of the operating members, also FIG. 13 is a schematic plane view of the excavator for showing the limitation of the leftmost and rightmost swinging angle of the swing member.

Referring to FIGS. 11 to 13, the functional select panel 78 is provided with a pair of datum plane select buttons 78a for selecting which line is used as the operational datum plane, said line selected from an absolute horizontal line AL of the ground or a practical positional line RL of the car frame of the excavator, a pair of swinging angle select buttons 78b for setting the leftmost swinging angle LΘ and the rightmost swinging angle RΘ of the swing motor 10, respectively, a pair of height select buttons 78c for setting the uppermost operating height UL and the lower-most operating height LL of operating members, such as the boom 26, the bucket 28 and the dipper stick 29. The select panel 78 is also provided with an operational radius select button 78d for setting the operational radius R of the operating members and a plurality of numeral keys 78e each having a number thereon and adapted for inputting a desired numeral value in cooperation with the select buttons 78a to 78d.

Also, the method for setting the actuating ranges of the actuators 6, 8, 10, 12, 14 and 16 is divided into two types. In one type, the operator previously sets the actuating ranges of the actuators 6, 8 10, 12, 14 and 16 in order to limit the operational ranges of the operating members by using the select buttons 78a to 78d and the numerals keys 78e of the functional select panel 78, and then actuates the actuators 6, 8, 10, 12, 14 and 16 in order to operate the members 26, 28 and 29 within the limited operating ranges thereof. In the other type, the operator practically actuates the actuators 6, 8, 10, 12, 14 and 16 in order to locate the members 26, 28 and 29 at respective desired positions, and then sets the positional values of the practical positions of the actuators 6, 8, 10, 12, 14 and 16 as the actuating ranges of the actuators.

Figure 14:
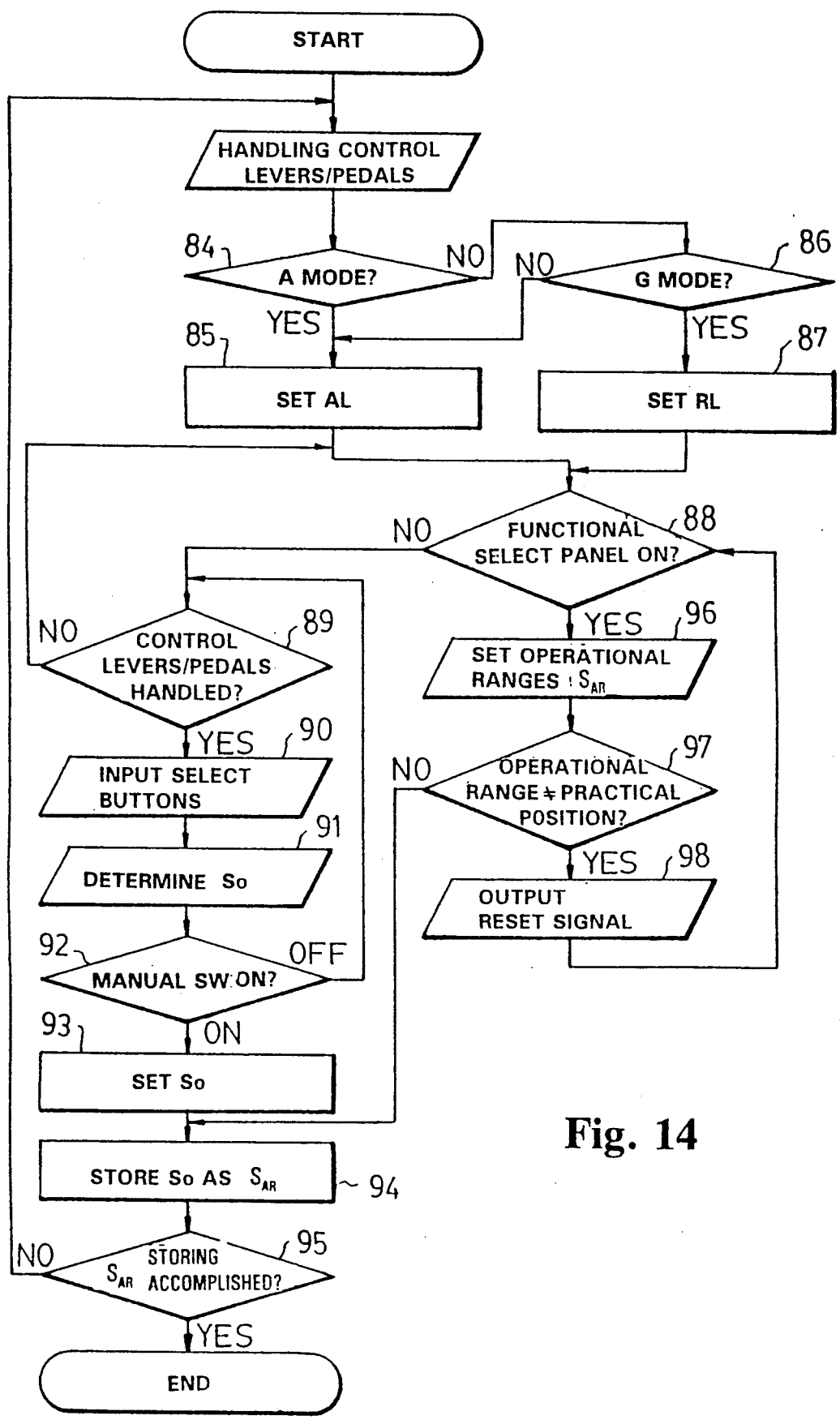
FIG. 14 is a flow diagram of an automatic control process for limiting the actuating range of the excavator performed by the control unit of FIG. 11 electrically connected to the hydraulic circuit of FIG. 1.

The control process performed by the above described control unit will be described in conjunction with the flow diagram of FIG. 14.

First, the functional select switch 79 is turned on in order to actuate the control unit to limit the actuating ranges of the actuators, thereby limiting the operating ranges of the operating members. Thereafter, which line is set as the operational datum plane by means of the datum plane select buttons 78a. That is, at an inquiry step 84, it is determined whether the absolute horizontal line is selected as the operational datum plane, in the other words, it is determined whether the A button is pushed in order to select the A mode. If the absolute horizontal line is selected as the operational datum plane, the process proceeds to a step 85 wherein the absolute horizontal line AL of the ground is set as the operational datum plane.

However, if the absolute horizontal line is not selected as the operational datum plane, the process proceeds to a next inquiry step 86 wherein it is determined whether the practical positional line RL of the car frame of the excavator is selected as the operational datum plane, in the other words, it is determined whether the G button is pushed in order to select the G mode. If the practical positional line RL of the car frame of the excavator is selected as the operational datum plane, the process proceeds to a step 87 wherein the practical positional line RL of the car frame is set as the operational datum plane. However, if the practical positional line RL of the car frame is not selected as the operational datum plane, the process proceeds to the step 85. Also, it is known that the uppermost operational line UL, the lowermost line LL and the operational radius of the excavator are changed in dependance upon selecting which line as the operation datum plane, as shown in FIG. 12. Upon accomplishing the selection of the operational datum plane as described above, the actuating ranges of the actuators 6, 8, 10, 12, 14 and 16 are set in order to be limited.

Thereafter at a step 88, it is determined whether the actuating ranges of the actuators are to be set by means of the select buttons 78a to 78d and the numeral keys 78e. In accordance with an answer of the step 88, the process for setting the actuating ranges of the actuators is performed in two types, that is a process in which the actuating ranges of the actuators is set by using the select buttons 78a to 78d and the numeral keys 78e (steps 96 to 98) and the other process in which the operator handles the control levers/pedals 21a and 21b in order to actuate the actuators so that the operating members move to respective critical operating positions then sets the values of the practical position by using the select buttons of the functional select panel 78 (steps 89 to 93).

If the actuating ranges of the actuators 6, 8, 10, 12, 14 and 16 are not to be set by the select buttons 78a to 78d and the numeral keys 78e of the functional select panel 78, the process proceeds to the step 89 wherein the control levers/pedals 21a and 21b are handled by the operator. Then, the select buttons of the functional select panel 78, which is corresponding to an actuator of which actuating range is to be set, are pushed at the step 90. Thus, the subject actuator is actuated so as to make the operating member corresponding to the subject actuator to reach the critical operating position thereof. Upon accomplishing the reaching of the operating member to the critical operating position, the sensor 23a, 23b, 23c, 23d, 23e, 23f of the subject actuator senses a displacement value $S_O$ of the subject actuator at the step 91. Thereafter at an inquiry step 92, it is determined whether the manual switch 80 is turned on. If the manual switch 80 is turned on, the process simply proceeds to a next step 93 wherein the displacement value $S_O$ of the subject actuator sensed by the sensor at the step 91 is set as the desired actuating range of the subject actuator. However, if the manual switch 80 is turned off, the process returns to the step 89 in order to cause the sensors 23a to 23f to repeatedly sense the displacement values of the actuators. Thus, the operator turns on the manual switch 80 as the operating members reach the desired critical operating extent, thereby causing the steps 93, 94 and 95 to be sequentially performed so that the displacement values $S_O$ of the subject actuators sensed by the sensors at the step 91 are set as the desired actuating ranges $S_{AR}$ of the subject actuators. Then, the control process for setting the actuating limits of the actuators ends at the end step.

On the other hand, If the actuating ranges of the actuators 6, 8, 10, 12, 14 and 16 are to be set by the select buttons 78a to 78d and the numeral keys 78e of the functional select panel 78, the process orderly proceeds to the steps 96 to 98. Through the step 96 to 98 in order, the desired actuating ranges $S_{AR}$ of the actuators 6, 8, 10, 12, 14 and 16 are set by the operator by using the select buttons 78a to 78d and the numeral keys 78e of the functional select panel 78 without handling the control levers/pedals 21a and 21b to actuate the actuators 6, 8, 10, 12, 14 and 16. At this time, the operator previously pushes the select buttons 78a and 78d and then inputs the desired numeral value by pushing the numeral keys 78e.

For example, if the desired uppermost operational height of the operating members, such as the boom 26, the bucket 28 and the dipper stick 29, is 10 m, the operator previously pushes the uppermost height button UH of the height select buttons 78c of the functional select panel 78, and then inputs the numeral value of 10 m by pushing key buttons of the numeral keys 78e of the panel 78. In this process, at the step 97 it is determined whether the practical positions of the actuators are not equal to the set actuating ranges thereof, that is it is determined whether the displacement values of the actuators 6, 8, 10, 12, 14 and 16 outputted from the sensors 23a to 23f of the actuators are over than the set actuating ranges of the actuators.

If the practical positions of the actuators are equal to the set actuating ranges thereof, the process simply to the step 94 wherein the actuating ranges of the actuators 6, 8, 10, 12, 14 and 16 are stored in the controller 24. However, if the practical positions of the actuators are not equal to the set actuating ranges thereof, the setting of the actuating ranges of the actuators is considered to be error. Thus, the process proceeds to the step 98 wherein a signal representing that the set actuating ranges of the actuators are erroneous ranges so that another ranges must be set. Thereafter, the process returns to the step 88.

During the above setting process for the critical actuating ranges of the actuators 6, 8, 10, 12, 14 and 16 of the excavator, if the operational datum plane is not selected by means of the datum plane select buttons 78a, it is considered that the setting mode for the operational datum plane is selected as the A mode, that is the absolute horizontal line AL is selected as the operational datum plane. Also in the setting process in which the actuating ranges of the actuators 6, 8, 10, 12, 14 and 16 are set by means of the practical positions of the actuators without using the select buttons 78a to 78d and the numeral keys 78e of the functional select panel 78, the manual switch 80, which is adapted for setting the critical operation limits of the operating members 26, 28 and 29 by means of the displacement values of the actuators 6, 8, 10, 12, 14 and 16, functions as a functional switch for setting the actuating ranges of the actuators.

On the other hand, in limiting the swinging angle of the swing motor 10 in accordance with this invention, there are two types of processes, A mode and G mode in dependance upon which line is selected as a swinging center line of the swing motor 10.

In the A mode, the swinging center line of the swing motor 10 is selected from an absolute swinging datum line AD taken along the center line of the operating members, that is the boom 26, the bucket 28 and the dipper stick 29 as the operating members 26, 28 and 29 are located at a position parallel with the crawlers 82 of the excavator as shown at the solid line of FIG. 13. While in the G mode, the swinging center line of the swing motor 10 is selected from a relative swinging datum line RD taken along the center line of the operating numbers 26, 28 and 29 as the operating members 26, 28 and 29 are located at a position having a turning angle with respect to the absolute swing datum line AD as shown at the phantom line of FIG. 13.

Thus, in setting the swinging angle of the swing motor 10, the datum plane select buttons 78a for selecting which line is selected as the operational datum line is first pushed in order to determine which mode of the A mode and G mode is select, then a desired swinging angle of the swing motor 10 is inputted by means of the numeral keys 78e, thereby accomplishing the setting for the leftmost and rightmost swinging angles of the swing motor 10 on the basis of the absolute swinging datum line AD or the relative swinging datum line RD. At this time, if the operator does not select any mode, it is considered that the mode is selected as the G mode so that the relative swinging datum line RD is automatically selected as the swinging center line of the swing motor 10.

Also, in limiting the actuating ranges, such as the uppermost and lowermost height, the leftmost and rightmost swinging angle, of the cylinder actuators 8, 14 and 16 by practical actuating the actuators 8, 14 and 16, the values of the actuating ranges are calculated by converting the displacement values of the actuators 8, 14 and 16 sensed by the sensors 23b, 23e and 23f into angles between respective operating member's 26, 28 and 29 which are connected to each other by means of connecting pins 83, that is each angle between the boom 26 and the dipper stick 29, and between the bucket 28 and the dipper stick 29, and geometrically calculating the angles, between respective operating members 26, 28 and 29, and the given lengths of the operating members 26, 28 and 29, thereby setting the uppermost operating heights of respective operating members 26, 28 and 29 with respect to the absolute horizontal line AL or the practical positional line RL of the cal frame. On the other hand, a depth to which the front tip of the bucket 28 reaches is set as the lowermost excavating depth of the excavator.

Figure 15:
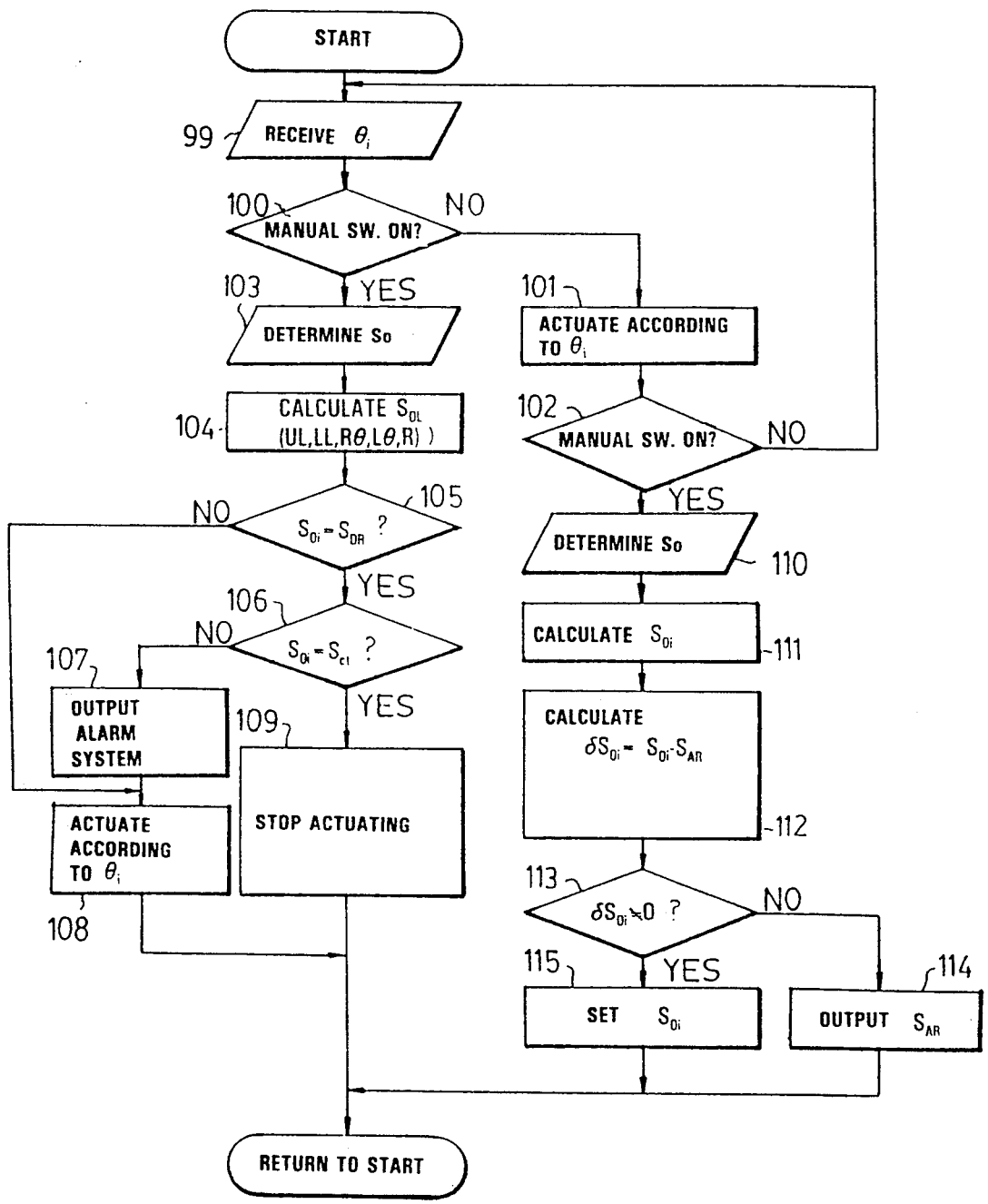
FIG. 15 is a flow diagram of an automatic controlling process for automatic actuating the actuators practically after limiting the actuating range of the excavator by the control unit of FIG. 11 electrically connected to the hydraulic circuit of FIG. 1.

Upon accomplishing the setting the actuating ranges of the actuators of the excavator as described above, the excavator will be operated as described in a flow diagram of FIG. 15.

As shown in FIG. 15, the operating process for the excavator of which actuating ranges of the actuators are previously set starts at the start step. Then, at a step 99, the control levers/pedals 21a and 21b are handled in order to output an electrical signal representing the handling value $\Theta_i$ to the controller 24. The process for treating the signal performed in two types in accordance with the answer at the step 100 wherein it is determined whether the manual switch 80 is turned on. After setting the values of actuating ranges of the actuators 6, 8, 10, 12, 14 and 16, the manual switch 80 functions as a select switch for determining whether the setting values are continuously maintained or removed, while it functioned as a setting switch for setting the values of the actuating ranges of the actuators during the process for setting the actuating ranges of the actuators.

At the step 100, if the manual switch is turned on, the process proceeds to a next step 103 wherein the actuators 6, 8, 10, 12, 14 and 16 are actuated in accordance with the handling value $\Theta_i$ of the control levers/pedals 21a and 21b having been received to the controller 24 at the step 99, and also, the sensors 23a to 23f sense the displacement values $S_O$ of the actuators in order to output signals representing the displacement values $S_O$ of the actuators to the controller 24. Thereafter, at a step 104, the controller 24 calculates the actuating values $S_{Oi}$ of the actuators, such as the uppermost and lowermost height UL, LL, the leftmost and rightmost swinging angles $L\Theta$, $R\Theta$ and the operating radius R' of the operating members. At a step 105, it is determined whether the calculated actuating values $S_{Oi}$ of the actuators are equal to the dangerous extent $S_{DR}$. If the calculated actuating values are not equal to the dangerous extent, the actuators are actuated in accordance with the handling value $\Theta_i$ of the control levers/pedals 21a and 21b, and thereafter, the process returns to the start step. However, if the calculated actuating values are equal to the dangerous extent, the process proceeds to a next inquiry step 106 wherein it is determined whether the calculated actuating values $S_{Oi}$ of the actuators are equal to the critical extent $S_{CT}$.

If the calculated actuating values of the actuators are not equal to the critical extent, the process proceeds to a step 107 wherein the controller 24 outputs a first alarm signal for alarming that there may be an operational danger to the operator. However, if the calculated actuating values of the actuators are equal to the critical extent, the process proceeds to a next step 109 wherein the controller 24 outputs a control signal to the wobbling angle control valves 19a and 19b and the pilot valve blocks 22a and 22b on order to drive the regulators 20a and 20b. Thus, the amount of hydraulic fluid from the first and second main hydraulic pumps 3 and 4 is considerably reduced or prevented from being distributed, or the spools of ti)e directional control valves 7, 9, 11, 13, 15 and 17 for respective actuators 6, 8, 10, 12, 14 and 16 are controlled in order to cause the hydraulic fluid for the actuators not to be distributed, thereby making the operating members not exceed the operating ranges thereof.

Turning again to the step 100, if the manual switch 80 is turned off, the process proceeds to a step 101 wherein the actuators are actuated in accordance with the handling values $\Theta_i$ of the control levers/pedals 21a and 21b. The manual switch 80 is often turned off by the operator in order to allow the actuators to actuate the operating members as the neighboring obstacles are removed or it needs to operate the operating members to a distance exceeding the operating ranges. Thereafter, at an inquiry step 102, it is determined whether the manual switch 80 is turned on. If the manual switch 80 is turned off, The process returns to the step 99. However, if the manual switch 80 is turned on, the process proceeds to a step 110 where in the sensors 23a to 23f of respective actuators 6, 8, 10, 12, 14 and 16 sense the displacement values $S_O$ of the actuators in order to output signals representing the displacement values of the actuators to the controller 24. Thereafter, at a step 111, the controller 24 calculates the actuating values $S_{Oi}$ of the actuators, such as the uppermost and lowermost height UL, LL, the leftmost and rightmost swinging angles $L\Theta$, $R\Theta$ and the operating radius R of the operating members. Then, At a step 112, the difference $\delta S_{Oi}$ between the calculated actuating values $S_{Oi}$ of the actuators and the previous set actuating ranges $S_{AR}$ of the actuators, such as the difference in the uppermost and lowermost height, the difference in rightmost and leftmost swinging angles. Thereafter, the process proceeds to a next inquiry step 113 wherein it is determined whether the practice operating positions of the operating members 26, 28 and 29 exceed the previous set operating ranges. If the practice operating positions of the operating members 26, 28 and 29 do not exceed the previous set operating ranges, that is if the practical positions of the members are positioned within the set operating ranges, the process proceeds to a step 114 wherein the previous set operating ranges $S_{AR}$ is considered to be available so that the operating ranges are continuously used. However, if the practice operating positions of the operating members 26, 28 and 29 exceed the previous set operating ranges, that is if the practical positions of the members are positioned at positions exceeding the set operating ranges, the process proceeds to a step 115 wherein the practical positional values $S_{Oi}$ of the actuators are set as a new operating ranges of the actuators instead of the previous set operating ranges.

For example, in case of turning off the manual switch 80 at the step 100 upon previous setting an uppermost height as 10 m, if the practical uppermost height of the operating members is measured as 11 m. tile practical uppermost height of 11 m is set at the step 115 as a new uppermost height of the operating member instead of the previous set uppermost height of 10 m as the manual switch 80 is again turned on at the step 102.

In addition, the automatic actuating system shown in FIG. 1 for the actuators of this invention controls the first and second main hydraulic pumps 3 and 4 to cause the quantity of hydraulic fluid flow therefrom to be optimally and automatically controlled in accordance with the loads of respective actuators 6, 8, 10, 12, 14 and 16, simultaneously with automatic controlling the quantity of hydraulic fluid flow for respective actuators.

The actuating system for providing optimal quantity of hydraulic fluid flow of the main pumps 3 and 4 is carried out as described hereinafter.

First, the control levers/pedals 21a and 21b are handled in order to output an electric signal representing the handling values thereof to the controller 24. The controller 24 receives and operates on the handling values of the control levers/pedals 21a and 21b, and outputs a signal representing the handling values to the pilot valve blocks 22a and 22b by way of the amplifiers 25a and 25b wherein the signal from the controller 24 is amplified. Thus, the pilot hydraulic fluid transferred from the third hydraulic pump 5 to the spools of respective directional control solenoid valves 7, 9, 11, 13, 15 and 17 by way of the pilot valve blocks 22a and 22b is automatically controlled, thereby causing the actuators 8, 10, 12, 14 and 16 to be automatically actuated by the hydraulic fluid transferred from the main pumps 3 and 4 thereto. Then, the sensors 23a to 23f of respective actuators sense the displacement values of the actuators and outputs signals representing the displacements of the actuators to the controller 24. The controller 24 operates the displacement values of the actuators 6, 8, 10, 12, 14 and 16 with the loads for the actuators and the required quantity of hydraulic fluid flow for the actuators 6, 8, 10, 12, 14 and 16 in order to optimally control the first and second main pumps 3 and 4. Thus, simultaneously with controlling both pumps 3 and 4 to charge equal load for an overloaded actuator in case of occurrence of overload on the actuator, the controller 24 controls the spools of the directional control solenoid valves for at least two actuators, which actuators are driven at the same time by the hydraulic fluid from both pumps 3 and 4, so as to allow the actuators to actuate at an equal actuating speed, thereby causing the main pumps 3 and 4 to drive so as to provide the optimal quantity of hydraulic fluid flow, and also controlling the actuators to improve the working effect thereof.

Figure 16:
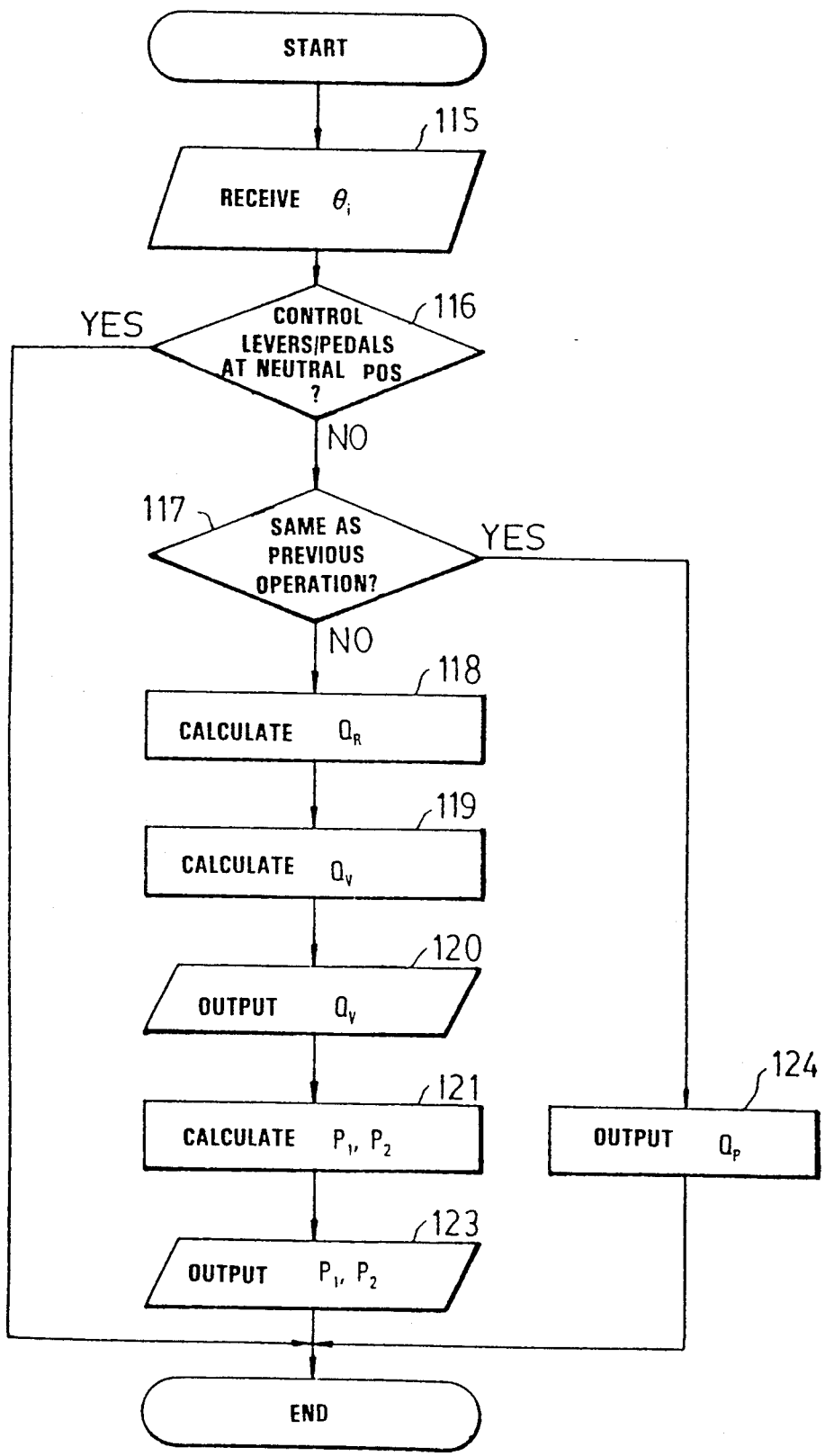
FIG. 16 is a flow diagram of an automatic controlling process for controlling the main hydraulic pumps so that the quantity of hydraulic fluid flow outputted from the main hydraulic pumps is automatically and optimally controlled in accordance with this invention.
Figure 17:
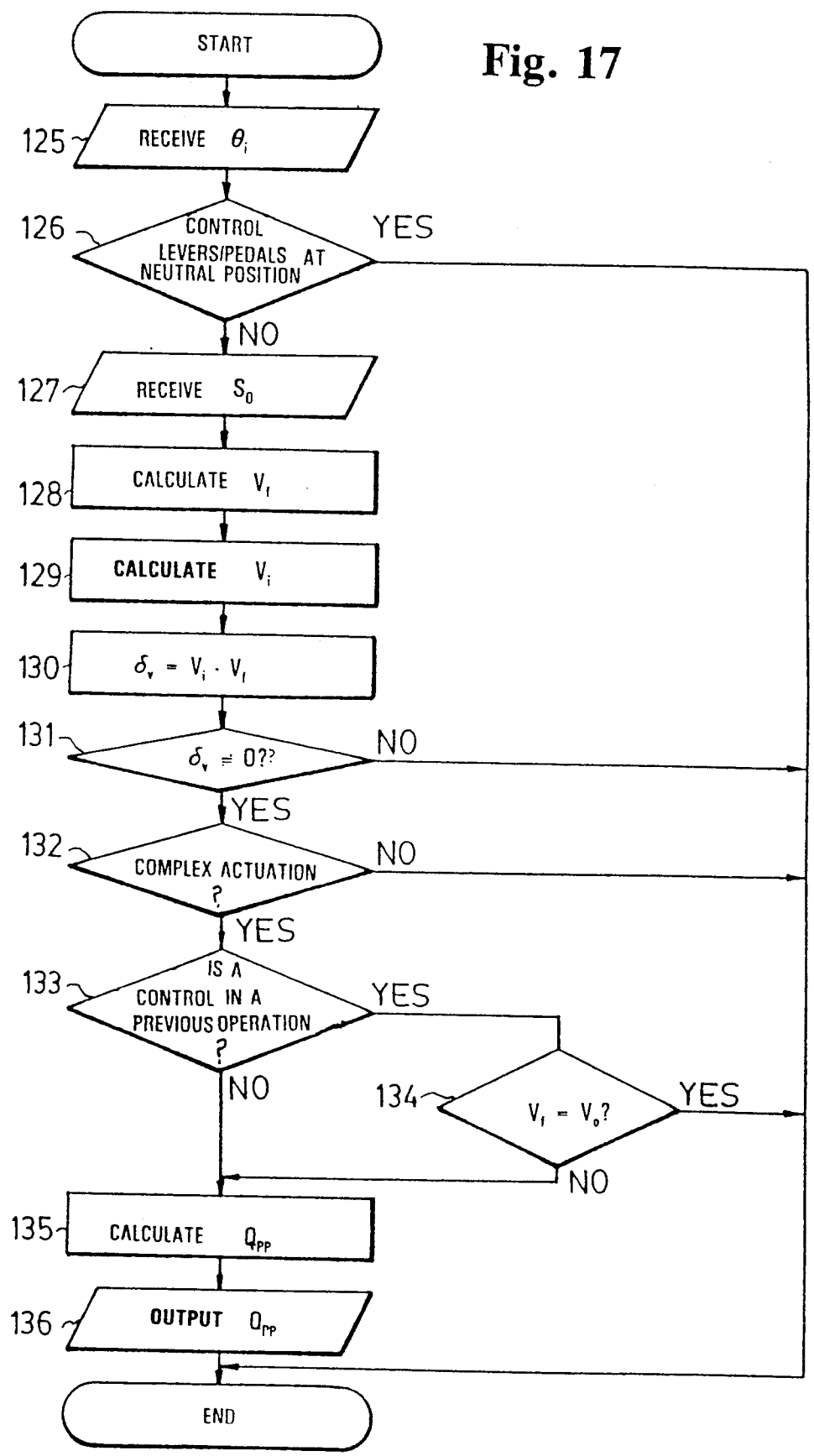
FIG. 17 is a flow diagram of an automatic control process for controlling the spool of each directional control valve so as to control the quantity of hydraulic fluid flow distributed from the main pumps to respective actuators which are overloaded in accordance with this invention.
Figure 21:
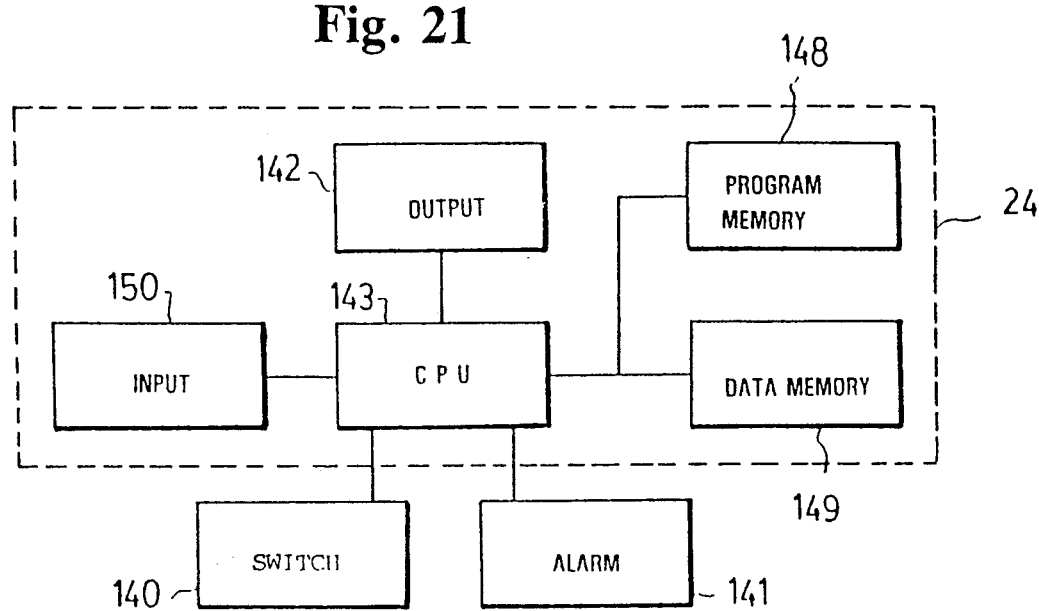
FIG. 21 is a block diagram of a control device provided at the controller of FIG. 1 for carrying out an automatic pre-running operation for the actuators in accordance with this invention.

The control process for optimal controlling the quantity of hydraulic fluid flow of the main pumps 3 and 4 will be detailedly described hereinafter in conjunction with FIGS. 16 and 17, FIG. 16 is a flow diagram showing an automatic controlling process for controlling the main hydraulic pumps so that the quantity of hydraulic fluid flow distributed from the main hydraulic pumps is automatically and optimally controlled, and FIG. 17 is a flow diagram showing an automatic controlling process for controlling the spool of each directional control valve so as to control the actuating quantity of hydraulic fluid flow distributed to respective actuators which are overloaded.

Referring first to FIG. 16, at a step 115 the control levers/pedals 21a and 21b are handled in order to actuate respective actuators so that an electrical signal representing the handling values $\Theta_i$ of the control levers/pedals 21a and 21b is outputted from the levers/pedals 21a and 21b to the controller 24. Then, the controller 24 compares the handling values from the lever/pedals 21a and 21b with previous values already inputted in the previous operation of the actuators. That is, at an inquiry step 116, it is determined whether the control levers/pedals 21a and 21b are positioned at the neutral positions. If the control levers/pedals 21a and 21b are positioned at the neutral positions, the process simply proceeds to an end step so that the controller 24 outputs an electrical signal representing the handling values of the control levers/pedals 21a and 21b to the pilot valve blocks 22a and 22b by way of the amplifiers 25a and 25b without any other control process.

However, if the control levers/pedals 21a and 21b are not positioned at the neutral positions, that is if it is determined that the control levers/pedals 21a and 21b were handled to drive the subject actuators to move forwards or backwards, the process proceeds to a next inquiry step 117 wherein it is determined whether the control levers/pedals 21a and 21b are handled in the same handling state as that of the previous operation. If the levers/pedals 21a and 21b are handled in the same handling state as that of the previous operation, the process simply proceeds to a step 124 in order to maintain the previous set quantity of fluid flow $Q_p$ without change. However, if the levers/pedals 21a and 21b are not handled in the same handling state as that of the previous operation, the controller 24 determines the handling values of the levers/pedals 21a and 21b.

Thereafter, the process proceeds to a step 118 wherein a required quantity of hydraulic fluid flow $Q_R$ which is to be outputted from each main pump 3, 4 is calculated in order to drive the subject actuator to move in correspondence with a required actuating value thereof as an electric current corresponding to an electric resistance generated by the handling value of the control levers/pedals 21a and 21b is applied to the controller 24. The controller 24 then performs a step 119 wherein it is calculated a required actuating value $Q_V$ of a directional control solenoid valve 7, 9, 11, 13, 15, 17, 18 of the subject actuator 6, 8, 10, 12, 14, 16, in which step 119 the value of the solenoid valve is calculated for moving the spool of the directional control solenoid valve so that a required amount of hydraulic fluid corresponding to the required actuating value of the subject actuator is efficiently supplied to the subject actuator from the main pumps 3 and 4. Then, the controller 24 outputs said required actuating value $Q_V$ to the solenoid valves.

Thereafter, the process simply proceeds to a next step 120, a step for calculating a divided amount of the hydraulic fluid of each main pump 3, 4. At the step 120, it is calculated respective amounts of hydraulic fluid P1 and P2 each which is to be distributed from the main pump 3, 4 according to the required amounts of the hydraulic fluid of the main pumps 3 and 4, said amounts each having been calculated at the step 118, and the required actuating value of the directional control solenoid valve of the subject actuator calculated at the step 119. The controller 24 thereafter outputs at a step 123 signals representing the amounts of hydraulic fluid P1 and P2 to the swash plate control valves 19a and 19b by way of the third amplifier 25c.

Additionally, the amount of hydraulic fluid which is to be outputted from each main pump 3, 4 is differently controlled in accordance with respective handling types of the control levers/pedals 21a and 21b, a single handling type operation in which an actuator is to be normally actuated, a single conflux handling type operation in which an overloaded actuator is to be actuated, and a complex handling type operation in which several actuators are to be actuated at the same time.

First in case of the single handling type, a control lever 21a or a control pedal 21b is handled in order to actuate a subject actuator 6, 8, 10, 12, 14, 16. In this case, the main pump 3, 4 outputs the hydraulic fluid to the subject actuator in accordance with a signal outputted from the controller 24, and also the variation of outputted quantity of hydraulic fluid flow is characterized by a characteristic curve of the outputted quantity of hydraulic fluid flow, y axis, with respect to the handling angles (%) of the control lever/pedal 21a, 21b, x axis, shown in the graph of FIG. 18. As shown in the drawing, the maximum flow of the hydraulic fluid occurs at about 90% of the handling angle, while the minimum flow occurs at about 10% of the handling angle. Also, the quantity of hydraulic fluid flow outputted from the main pump 3, 4 gradually increases along a secondary functional curve in a range of 10%–90% of the handling angle.

Second in case of the single conflux handling type, a control lever 21a or a control pedal 21b is handled in order to actuate an overloaded actuator, a subject actuator, such as the dipper cylinder 16 or the boom cylinder 14. In this case, even though a main pump 3, 4 communicating with the subject actuator is driven to output the maximum amount of the hydraulic fluid, the amount of the hydraulic fluid outputted from the subject main pump 3, 4 is deficient in actuating the subject cylinder actuator 8, 14. Thus, the subject main pump 3, 4 is excessively driven, while the other pump 4 does not operate, thereby occurring unbalance in the whole hydraulic circuit of the automatic actuating system by virtue of the main pumps 3 and 4.

To remove the unbalance, the sensor 23b, 23f of the actuator 8, 16 senses the displacement speed (actuating distance of the actuator per an unit time) of the subject cylinder actuator 8, 16, and then a signal representing the sensed displacement speed to the controller 24 wherein the quantity of hydraulic fluid flow which is outputted from the main pump 3, 4 according to the handling angle of the control levers/pedals 21a and 21b is compared with the sensed displacement speed of the subject actuator. If it is determined that the quantity of hydraulic fluid flow $Q_1$ outputted from the main pump 3, 4 communicating with the subject actuator 8, 16 is deficient in actuating the subject cylinder actuator 8, 14, the controller 24 controls the other main pump 3, 4 to be driven so that the quantity of hydraulic fluid flow $Q_2$ outputted from the other pump 3, 4 is confluent with the quantity of hydraulic fluid flow $Q_1$ outputted from the main pump 3, 4 communicating with the subject actuator 8, 16, thereby causing the conflux of the quantity of fluid flow $Q_1$ and $Q_2$ from the main pumps 3 and 4 to be supplied to the subject actuator 8, 16. Thus, the overload imposed on the subject actuator 8, 16 is equally charged by the first and second main pumps 3 and 4.

Here, if the subject hydraulic pump 3, 4 was hardly actuated when the other pump 3, 4 is actuated, the subject actuator 8, 16 is momentarily supplied with confluent excessive flow of the hydraulic fluid from the first and second pumps 3 and 4 so as to impose a mechanical shock on the actuator 8, 16, resulting in occurrence of trouble at the actuator 8, 16. Thus, the other pump 3, 4 is controlled so as to start to be driven after a minute operating time since the subject pump 3, 4 was driven, thereby allowing the actuator 8, 16 to be prevented from being shocked and improving the working effect of the actuator.

Third, the complex handling type operation in which several actuators are to be actuated at the same time is detailedly described as divided into four cases as follows.

1. When a group of actuators, of which directional control solenoid valves 7, 9 and 11 or 13, 15, 17 and 18 are not cross-connected to each other, are actuated at the same time, and also the other group of actuators are not actuated, the quantity of fluid flows $Q_1$ and $Q_2$ of the first and second main pumps 3 and 4 can not confluent with each other because there is no cross line connected therebetween. Thus, the main pump 3, 4 in this case is controlled by controller 24 in the same manner as that of the abovementioned single handling type. This type of operation does not need an auxiliary control for the quantity of hydraulic fluid flow.

Thus, as actuators from two groups of actuators, said two groups of actuators connected to the main pump 3 and 4, respectively, are considered to be overloaded during an operation, the directional control valves thereof are previously crossconnected to each other so as to be connected between respective inlet lines of the control valves, said inlet lines each communicating with the main pump 3, 4, while the other actuators which are considered to be normally actuated during the operation are not crossconnected to each other by being crossconnected between respective inlet lines of the control valves thereof, thereby accomplishing the control for the above first case of the complex handling type operation.

Referring to the hydraulic circuit of FIG. 1 in order to mare detailedly describe the above case, a first cross connecting line 27a provided with a check valve 27c is connected between the inlet line of the third directional control valve 11 of the swing motor 10 and the sixth directional control valve 17 of the boom cylinder 16. Also, a second cross connecting line 27b is connected between the inlet line of the first directional control valve 7 of the dipper cylinder 7 and the fourth directional control valve 13 of the bucket cylinder 14. Thus, the actuators 8 and 14, 10 and 16, which are crossconnected to each other resulting from being crossconnected between the inlet lines of the directional control valves 7 and 13, 11 and 17 thereof, are supplied by virtue of the cross lines 27a, 27b with confluent quantity of fluid flow $Q_1$ and $Q_2$ from the first and second main pumps 3 and 4 as demanded, while the other actuators 9, 13, 15 and 18, which are not crossconnected to each other, are actuated in the same manner as that of the abovementioned single type of operation.

2. If it is considered that two actuators can be actuated at same time by using a quantity of hydraulic fluid flow outputted from a main pump 3, 4, the controller 24 controls the main pump 3, 4 to output the sum of respective required quantity of hydraulic fluid flow for actuating respective actuators under the condition of the abovementioned single type of handling.

For example, if the operator controls the bucket 28 to be actuated simultaneously with controlling the boom 26 to move down, the quantity of hydraulic fluid flow outputted from the main pump 3, 4 is sufficient in actuating the actuators 26 and 28 at the same time because the load imposed on the boom 26 which is controlled to move down is relatively light.

For numerical description of the above case, if it is supposed that a half of the maximum quantity of fluid flow outputted from the second main pump 4 is needed in actuating the bucket 28 and one fourth of the maximum quantity of fluid flow outputted from the main pump 4 is needed in actuating the boom 26 to move down, the necessary quantity of fluid flow for actuating the boom 26 and the bucket 28 at the same time is calculated as three fourth of the maximum quantity of fluid flow outputted from the main pump 4 so that the controller 24 controls the second main pump 4 to output three fourth of the maximum quantity of fluid flow thereof.

3. However, in case of a complex type of handling wherein the operator controls the boom 26 to move up simultaneously with controlling the bucket 28 to be actuated, even the maximum quantity of hydraulic fluid flow outputted from a main pump 3, 4 is not sufficient in actuating the boom 26 and the bucket 28 at the same time as the boom cylinder 17 actuating the boom 26 to move up needs quantity of hydraulic fluid flow much more than that in case of being actuated to move down. Therefore in this case, it is determined that the two main pumps 3 and 4 are driven to output hydraulic fluid therefrom.

In accordance, the controller 24 controls the second main pump 4 to output the maximum quantity of hydraulic fluid flow thereof so that a considerable part of the quantity of fluid flow from the second pump 4 is supplied to the bucket cylinder 14 in order to satisfy the required quantity of fluid flow. Also, the other part of the quantity of fluid flow from the second pump 4 is supplied to the boom cylinder 16 in order to actuate the boom 26 to move up even though the quantity of fluid flow supplied to the boom cylinder 16 is deficient in actuating the cylinder 16. In addition, the controller 24 controls the first main pump 3 to output hydraulic fluid thereof to the boom cylinder 16 by way of the first cross connecting line 27a in order to satisfy the shortage of the required quantity of fluid flow of the boom cylinder 16 for actuating the boom 26 to move up.

In this case, the controller 24 receives an electrical signal representing the handling values from the control levers/pedals 21a and 21b for the bucket cylinder 14 and the boom cylinder 16 and signals representing respective actuating speed of the bucket cylinder 14 and the boom cylinder 16 sensed by the fifth and sixth sensor 23e and 23f. Thereafter, the signals having been received by the controller 24 is operated by the controller 24 in order to determine the actuating states of the cylinders 14 and 16. If it is determined that the bucket cylinder 14 is normally actuated, but the boom cylinder 16 is abnormally actuated so that the moving-up speed of the boom 26 is relatively slow than normal speed in order to deteriorate the working effect, the controller 24 controls the first main pump 3 to be driven simultaneously with outputting a control signal to the swash plate control valves 19a and 19b. Then, these swash plate control valves 19a and 19b control the regulators 20a and 20b in order to control the inclination angles of the swash plate 3a and 4a of the hydraulic pumps 3 and 4 connected thereto to control the first and second main pump 3 and 4 so as to equalize respective quantity of hydraulic fluid flow outputted from the pumps 3 and 4 to each other.

4. On the other hand, if the actuators are actuated such that the bucket 28 and the dipper stick 29 are actuated simultaneously with swinging the swing motor 10 in order to swing the upper frame of the excavator with respect to the lower frame, the controller 24 controls the first and second main pumps 3 and 4 to be driven in the same manner that of the case (3). On the other words, the first pump 3 is driven to output the quantity of hydraulic fluid flow to the swing motor 10 for swinging the upper frame with respect to the lower frame and the dipper cylinder 8, while the second pump 4 is driven to output the quantity of hydraulic fluid flow to the boom cylinder 16. In the same manner as that of the case (3), the quantity of fluid flow outputted from the first main pump 1 is supplied to the boom cylinder 16 by way of the first cross connecting line 27a in accordance with respective loads imposed on respective actuators 8, 10 and 16. Also, control for the main pumps 3 and 4 in this case is performed in the same mariner as that of the above case (3). That is, the controller 24 receives an electrical signal representing the handling values from the control levers/pedals 21a and 21b for the dipper cylinder 8, the swing motor 10 and the boom cylinder 16 and signals representing respective actuating speed of the dipper cylinder 8, the swing motor 10 and the boom cylinder 16 sensed by the second, third and sixth sensors 23b, 23c and 23f. Thereafter, the signals having been received by the controller 24 are operated by the controller 24 in order to determine the actuating states of the actuators 8, 10 and 16. If it is determined that the dipper cylinder and the swing motor 8 and 10 are normally actuated, but the boom cylinder 16 is abnormally actuated so that the actuating speed of the boom cylinder 16 is relatively slow than normal speed, the controller 24 controls the first main pump 3 to be driven simultaneously with outputting a control signal to the swash plate control valves 19a and 19b. Thus, respective quantity of hydraulic fluid flow outputted from the pumps 3 and 4 is controlled to be equalized to each other.

Additionally, when at least two actuators are actuated at the same time such that simultaneously with actuating the boom 26 to move up the operator actuates the bucket 28, the controller 24 can control the main pumps 3 and 4 in the same manner as that of the above case (3) in case of normal loads on the actuators 14 and 16. However, if an overload occurs on the bucket 28 such as by virtue of a relatively heavy obstacle caught thereon, the normal operation of the main pumps 3 and 4 as described in the case (3) can not satisfy the required actuation of the actuator 14 and 16. The reason why the normal operation of the main pumps 3 and 4 can not satisfy the desired actuation of the actuator 14 and 16 is described in FIG. 20 showing a graph of a characteristic curve of the quantity of fluid flow outputted from the main pumps 3 and 4 with respect to the load on the actuators. As shown in FIG. 20, it is known that the maximum quantity of hydraulic fluid flow is reduced from $2Q_1$ in case of a normal load $P_1$ to $Q_2$ in case of an increased abnormal load $P_2$.

Accordingly, in case of occurrence of the normal load $P_1$, the actuators 14 and 16 each is supplied with an equalized quantity of fluid flow $Q_1$ in order to be actuated at a normal actuating speed. However, in case of occurrence of the abnormal load $P_2$ on an actuator, for example the bucket 28, the boom cylinder 16 is supplied with a quantity of fluid flow $Q_1$, while the bucket cylinder 14 is supplied with the difference $Q_2-Q_1$ of the maximum quantity of fluid flow $Q_2$ and the quantity of fluid flow $Q_1$ which is to be supplied to the boom cylinder 16, thereby causing the quantity of fluid flow for the bucket cylinder 14 to be considerably short than required quantity of fluid flow so that the bucket cylinder 14 does not normally actuate the bucket 28. At this time, the controller 24 cause the actuators 14 and 16 to be supplied with an equalized quantity of fluid flow $Q_1'$, resulting from dividing the maximum quantity of fluid flow $Q_2$ into two, thereby allowing the actuators 14 and 16 to be actuated at an equalized and reduced actuating speed.

FIG. 17 is a flow diagram showing a control process for controlling the quantity of hydraulic fluid flow outputted from the first and second main pumps 3 and 4 so as to be optimally supplied to respective actuators 6, 8, 10, 12, 14 and 16 in accordance with loads on the actuators.

Referring to FIG. 17, at a first step 125 the control levers/pedals 21a and 21b is handled so as to output an electric signal representing the handling angles $\Theta_i$ to the controller 24. The controller 24 then compares the inputted signal with the previous stored values. That is, at an inquiry step 126, it is determined whether the control levers/pedals 21a and 21b are positioned at the neutral positions. If the control levers/pedals 21a and 21b are positioned at the neutral positions, the process simply proceeds to an end step so that the controller 24 outputs an electrical signal representing the handling values of the control levers/pedals 21a and 21b to the pilot valve blocks 22a and 22b by way of the amplifiers 25a and 25b without any other control process.

However, if the control levers/pedals 21a and 21b are not positioned at the neutral positions, that is if it is determined that the control levers/pedals 21a and 21b were handled to drive the subject actuators to move forwards or backwards, the process proceeds to a next step 127 wherein the practice positional values $S_O$ of the actuators are sensed by the sensors 23a to 23f and outputted from the sensors to the controller 24. Thereafter, the controller 24 calculates at a step 128 the practical actuating speed $V_f$ of respective actuators and then calculates at a step 129 the required actuating speed $V_i$ of the actuators in accordance with the handling values of the control levers/pedals 21a and 21b. At steps 130 and 131, the controller 24 calculates the difference $\delta V$ ($=V_i-V_f$) between the required actuating speed $V_i$ and the practical actuating speed $V_f$ of the actuators (the step 130) and determines whether a subject actuator is practically overloaded (the step 131). If no actuator is practically overloaded, the process simply proceeds to the end step. However, if an actuator is practically overloaded, the controller 24 performs a next inquiry step 132 wherein it is determined whether a complex actuation is carried out, that is it is determined whether at least two actuators are actuated upon driving both main pumps 3 and 4, and also whether a control process for removing the overloaded state of the actuator is practically performed.

If the complex actuation is not carried out, the process simply proceeds to the end step. However, if the complex actuation is now carried out, the controller 24 performs a next inquiry step 133 wherein it is determined whether a control for such an overloaded state of the actuator was carried out during the previous operation. If a control for such an overloaded state of the actuator was carried out during the previous operation, the controller 24 performs a next inquiry step 134 wherein it is determined whether the practical actuating speed $V_f$ of the actuators is equal to the controlled actuating speed $V_O$ of the actuators previously having been stored in the controller 24 during the previous operation. If the practical actuating speed $V_f$ of the actuators is equal to the controlled actuating speed $V_O$ of the actuators, the process simply proceeds to the end step so that the controller 24 outputs a signal corresponding to the controlled actuating speed $V_O$ of the actuators to the pilot valve blocks 22a and 22b by way of the amplifiers 25a and 25b. However, if the practical actuating speed $V_f$ of the actuators is not equal to the controlled actuating speed $V_O$ of the actuators, the controller 24 performs a step 135 wherein it is calculated a required quantity of hydraulic fluid flow $Q_{pp}$ for each actuator 6, 8, 10, 12, 14, 16 in accordance with the load on each actuator. Then, at a step 136, control signals for controlling each directional control solenoid valve 7, 9, 11 13, 15, 17, 18 in accordance with the required quantity of hydraulic fluid flow $Q_{pp}$ for each actuator having been calculated at the step 135 are outputted from the controller 24 to the pilot valve blocks 22a and 22b by way of the amplifiers 25a and 25b.

However, from the step 133, If a control for such an overloaded state of the actuator was not carried out during the previous operation, the controller 24 simply performs the step 135.

As described above, if an overload occurs on an actuator as at least two actuators are actuated at the same time, the controller 24 compares the practical actuating speed $V_f$ of respective actuators sensed by the sensors with the required actuating speed $V_i$ of the actuators in accordance with the handling values of the control levers/pedals 21a and 21b. Thus, if there is a difference $\delta V\ (=V_i-V_f)$ between the required actuating speed Vi and the practical actuating speed $V_f$ of the actuators, it determines that an actuator is practically overloaded. Then, the controller 24 divides the maximum quantity of hydraulic fluid flow of the pumps 3 and 4 into each required quantity of hydraulic fluid flow which is to be supplied to each actuator 6, 8, 10, 12, 14, 16 in accordance with the load on each actuator. Then, the controller 24 outputs control signal corresponding to the respective divided quantity of hydraulic fluid flow which is to be supplied to each actuator to the pilot valves, corresponding to the subject actuators, of the pilot valve blocks 22a and 22b by way of the amplifiers 25a and 25b. Thus, the pilot valves corresponding to the subject actuators efficiently control the quantity of pilot hydraulic fluid flow which is outputted from the third pump 5 to the spool of each directional control solenoid valve 7, 9, 11, 13, 15, 17, 18 in order to control the spool to move rightwards or leftwards.

Also, in case of occurrence of overload $P_2$ on an actuator, resulting in outputting the maximum quantity of fluid flow $Q_2$ of the main pumps 3 and 4 as shown in FIG. 20, the maximum quantity of fluid flow $Q_2$ is divided into two parts, an equalized quantity of fluid flow $Q_1'=Q_2/2$ so as to be supplied to the actuators. Thus, it is possible to actuate the actuators at an equalized actuating speed even though the equalized actuating speed is relatively slow than that of the actuators in case of occurrence of normal load, thereby causing the excavator even in case of occurrence of overload to be efficiently actuated at a balanced actuating speed even though the speed is relatively slow than that thereof in case of occurrence of normal load.

On the other hand, FIGS. 21 to 26 shows an automatic pre-running system for operating the actuator of the excavator according to the present invention at a normal state. As shown 1 n FIG. 21, the system comprises the controller 24 which controls the operation of the hydraulic circuit shown in FIG. 1, a switch 140 for applying a signal for pre-running the actuator to the controller 24, and an alarm 141 for alarming error occurring during the automatic pre-running operation. The controller 24 generally comprises an input unit 150, an output unit 142, a CPU 143, a program memory 148, and a data memory 149.

The input unit 150 may comprises an A/D convertor which functions to receive analog signals generated by the actuation of the control lever 21a and the control pedal 21b and convert them into digital data to be supplied to the CPU 143. The CPU 143 receives digital data from the input unit 150 and store it in its internal memory. On the basis of the data stored in the internal memory and the data, for example gray code, stored in the data memory 149, the CPU 143 outputs control signals for driving respective actuators 6, 8, 10, 12, 14 and 16, through the output unit 142.

In response to the actuation of the switch 140, the CPU 143 performs its automatic pre-running operation, according to the program stored in the program memory 148. This automatic pre-running operation will now be described.

Figure 22:
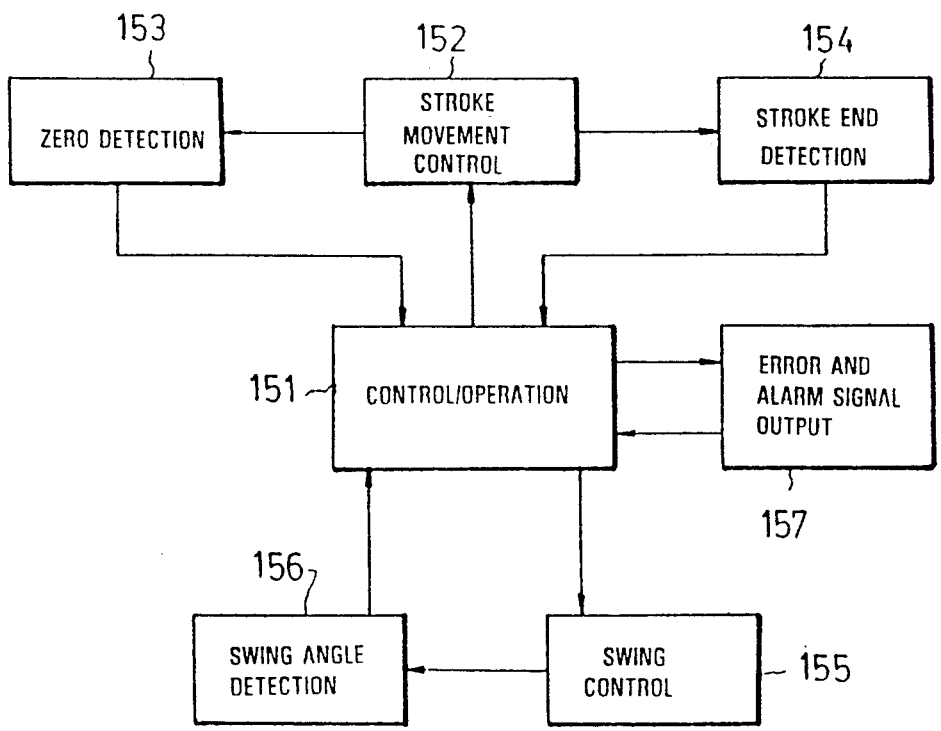
FIG. 22 is a functional block diagram of the CPU of FIG. 21.

Referring to FIG. 22, there is shown a functional block diagram of the CPU 143. As shown in the drawing, the CPU 143 comprises a stroke driving unit 152, a swing control unit 155, a zero detection unit 153, a stroke end detection unit 154, a swing angle detection unit 156, and a control/operation unit 151 for controlling operations of said stroke driving unit 152 and said swing control unit 155 and performing the operation and the control, on the basis of detection signals from said zero detection unit 153 and said strobe end detection unit 154.

The stroke driving unit 152 moves respective strokes of the dipper cylinder 8, the boom cylinder 16 and the bucket cylinder 14, according to the control of the control/operation unit 151, as shown in FIG. 23. In FIG. 23, the internal stroke end is a stroke end point provided by the stroke driving unit 152, that is a predetermined stroke end point, while the mechanical stroke end is an actual stroke end point of each stroke. The stroke movement control unit 152 decreases gradually the movement velocity of each stroke in the range between the point positioned at the interval of 100 ms before the internal stroke end and the internal stroke end and then moves the stroke a predetermined lower velocity (for example, 5% of the maximum velocity) in the range between the internal stroke end and the mechanical stroke end, so that the mechanical impact occurring between the stroke and its actuator is released.

The zero detection unit 153 and the stroke end detection unit 154 detect the zero point and the stroke end point, and apply them to the control/ operation unit 151, respectively. Now, the detection operations will be described with reference to FIG. 24.

Figure 24:
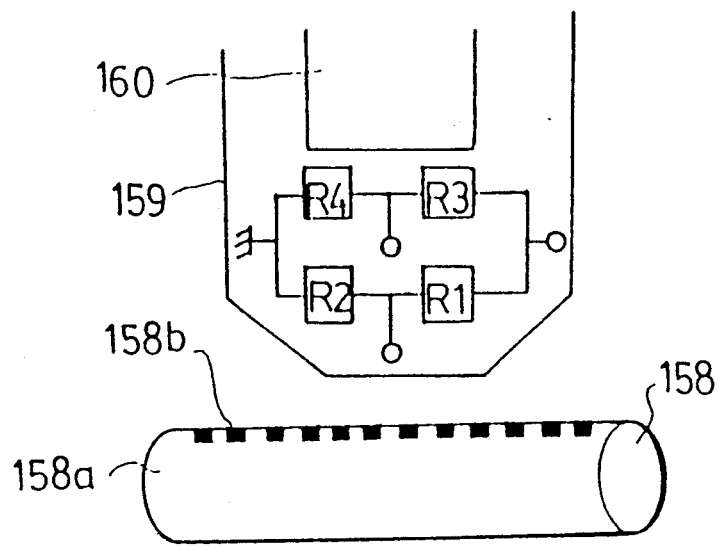
FIG. 24 is a schematic view showing the relative construction of the stroke and the magnetic sensor of FIG. 23.

Referring to FIG. 24, there is shown a stroke 158 and a magnetic sensor 159 disposed at a certain portion of an actuator to detect the movement of said stroke 158. The actuator may be the cylinders 8, 14 and 16. The stroke 158 is coated with a magnetic layer 158a. On the magnetic layer 158a, 0.5 mm scales of nonmagnetic material are formed. The magnetic sensor 159 has a permanent magnet 160 and a self inductance elements R1 to R4. Accordingly, the movement and the movement amount of the stroke 158 are detected according to magnetic flux variation or pulses by the magnetic material 158 and the nonmagnetic material 158b. The portion of magnetic material 158a disposed at the center portion of the stroke 158 has different concentration from that of the other portion of magnetic material 158a so that the magnetic flux generated at the former portion of magnetic material 158a is different from that of the latter portion of magnetic material 158a, thereby enabling the center point, that is the zero point to be detected.

The stroke end detection unit 154 detects the movement of the stroke 158, on the basis of a detection signal outputted from the magnetic sensor 159. If the stroke 158 stops for more than 2 seconds during the movement thereof, the point at which the stroke 158 has been stopped is detected as the stroke end in the moving direction of the stroke 158. When the center portion of the stroke 158 varies its detection output after passing the magnetic sensor 159, the zero detection unit 153 detects the detection output variation point as the zero point and sends its detection output to the control/operation unit 151.

On the other hand, the swing control unit 155 controls the swing motion of the swing motor 10 shown in FIG. 1, while the swing angle detection unit 156 detects the swing angle of the swing motor 10. The swing angle detection is carried out, on the basis of, for example, detection signals from a light emitting element and a light receiving element provided at a swing motor reduction memory. In the case of, for example, an absolute encoder type sensor, the value of gray code based on the swing angle is outputted therefrom. At this time, the swing angle detection unit 156 detects the swing angle, on the basis of the value of gray code, and apply it to the control/operation unit 151.

Also, the error and alarm signal output unit 157 send error and alarm signals to the alarming device 141, on the basis of data stored in the data memory 149 and the result from the operation of the control/operation unit 151. The control/operation unit 151 performs a predetermined control, on the basis of error signal from the error and alarm signal output unit 157. These controls performed by the control/operation unit 151 and the error and alarm signal output unit 157 are illustrated in FIG. 25.

Figure 25A:
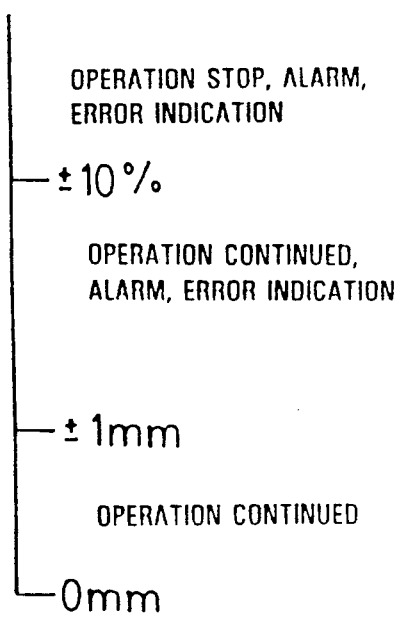
FIGS. 25A and 25B are a schematic view showing the error control performed by a control/operation unit of FIG. 22.
Figure 25B:
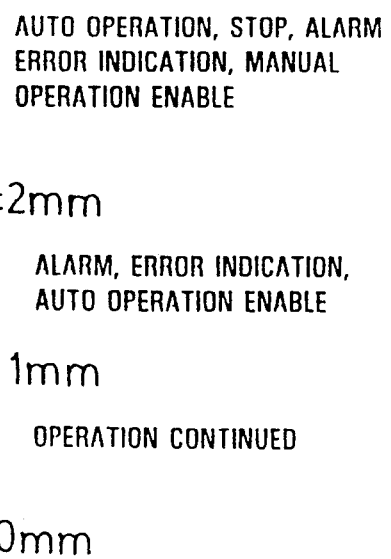

FIG. 25A shows an error control performed during the pre-running operation, while FIG. 25B shows a control during the automatic operation based on the error tolerance which has been detected during the pre-running operation.

When the error tolerance is more than ±10% during the pre-running operation, the pre-running operation is stopped. Simultaneously, alarming and indicating of the error tolerance are performed. On the other hand, if the error tolerance is ±10% to ±1 mm (herein, the tolerance indicated by "mm" means the length tolerance of the stroke), the pre-running operation is continued, while alarming and indicating of the error tolerance are performed. In the case of the error tolerance of ±1 mm to 0 mm, the pre-running operation is continuously performed. When the error tolerance is more than ±2 mm during the automatic operation, the automatic operation is stopped. Simultaneously, alarming and indicating of the error tolerance are performed. On the other hand, if the error tolerance is ±2 mm to ±1 mm, alarming and indicating of the error tolerance are only performed (in this case, a manual operation can be performed). In the case of the error tolerance of ±1 mm to 0 mm, the automatic operation is normally performed.

Now, the pre-running operation according to the above-mentioned control system will be described.

Referring to FIG. 26, there is shown the pre-running operation performed for each stroke. Pre-running operations proceed in the order of the stroke of the stroke of boom cylinder 16, the stroke of dipper cylinder 8 and the stroke of bucket cylinder B. Since these pre-running operations are substantially the same, only tile pre-running operation for the boom cylinder 16 is described.

Figure 26A:
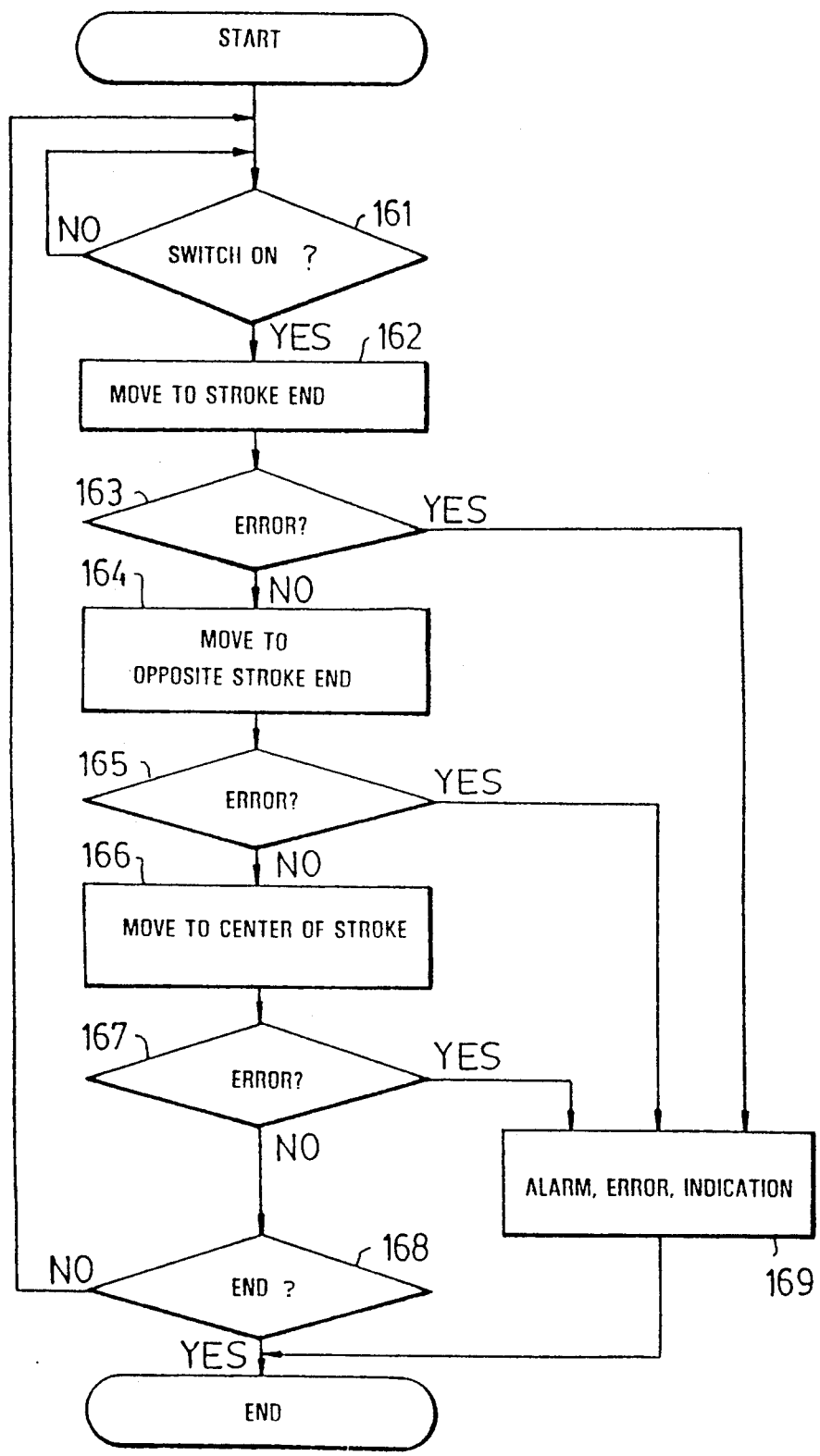
FIGS. 26A and 26B are interrelated flow diagrams of the pre-running operation performed by the control device of FIG. 21.

As shown in FIG. 26A, where the switch 140 is turned on at the step 161, the operation for moving the stroke of the boom cylinder 16 is initiated at the step 162, thereby causing the stroke of the boom cylinder 16 to move to its one end. At the step 162, this operation is performed to lift the boom. At this time, if there is no movement of the stroke for more than 2 seconds, the present position of the stroke is detected as the end point and then the operation is stopped. Thereafter, it is checked, at the step 163, whether error has occurred. If error has occurred, that is, when the generated error is of more than allowable tolerance, the alarming device 141 alarms this error. Simultaneously, the error tolerance is indicated and the stroke moving operation is stopped.

On the other hand, if no error has been checked at the step 163, that is where the generated error is of no more than the allowable tolerance, the stroke is moved in the opposite direction, that is the direction of lowering the boom cylinder 16. During this movement of the stroke, the zero point is checked. This operation is executed at the step 164. At this time, the error and alarm signal output unit 157 compares the distance between the stroke end and the zero point determined at the step 164, with data stored in the data memory 149, so as to check the generation of error. If it is determined that error has occurred, alarming and indicating of error is performed at the step 169 and the operation is completed.

If no error has been detected at the step 165, the boom 26 is moved to the center of the stroke. This operation is performed at the step 166. In similar to that in the step 165, it is checked at the step 167 whether error has been generated. If it is determined that error has occurred, alarming and indicating of error is performed at the step 169 and the operation is stopped. On the other hand, if no error has been generated, the operation is completed.

The abovementioned operation is also identically performed in cases of the dipper stick 29 and the bucket 28.

Figure 26B:
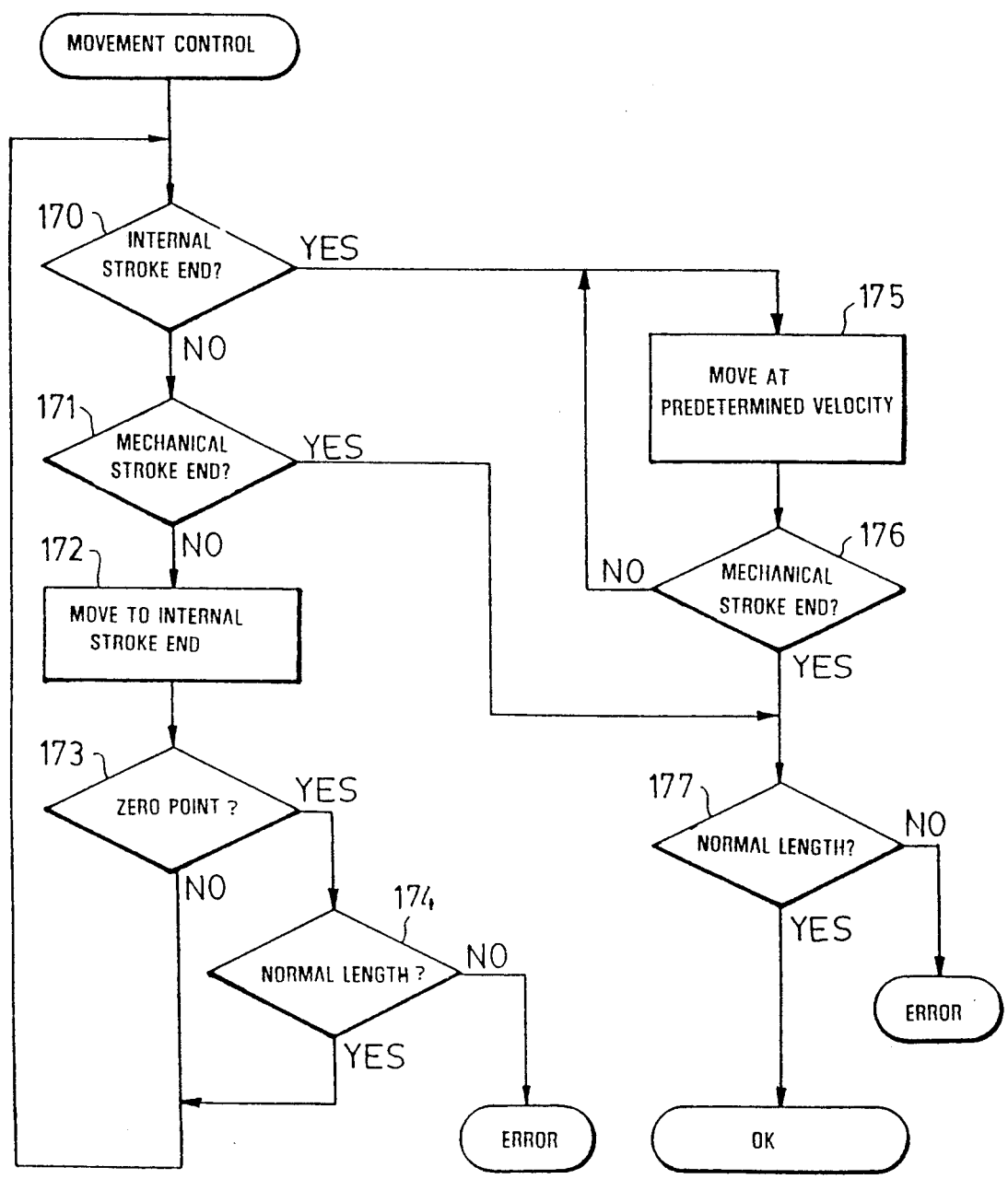

On the other hand, FIG. 26B shows a subroutine corresponding to the stroke movement control steps (that is, steps 162, 164 and 166). That is, the control/operation unit 151 determines, on the basis of a detection signal from the stroke end detection unit 154, whether the stroke is positioned at the internal stroke end point. This determination is performed at the step 170. If the stroke is positioned at the internal stroke end point, the stroke moves at the velocity corresponding to 5% of the maximum velocity, as described in conjunction with FIG. 23 (at the step 175). Thereafter, it is determined at the step 176 whether the stroke moves to the stroke end point. That is, if the stroke has been maintained at the stopped condition for more than 2 seconds, it is determined at the step 177 whether the distance between the zero point and the stroke end point is the normal length. When the distance is not the normal length, error signal occurs. At this time, the determination at the step 177 is executed on the basis of data stored in the data memory 149, as mentioned above.

On the other hand, if it is determined at the step 170 that the stroke is not positioned at the internal stroke end point, the routine proceeds to the step 171 for determining whether the stroke is positioned at the mechanical stroke end point. At this time, when the stroke is positioned at the mechanical stroke end point, the routine proceeds to the step 177 for determining whether the distance between the zero point and the stroke end point is the normal length. If the stroke is not positioned at the mechanical stroke end point, that is, if the stroke is positioned at neither of the internal stroke end point or the mechanical stroke end point, it is moved to the internal stroke end point. This movement is performed at the step 172. During the movement of the stroke, it is determined at the step 173 whether the zero point is detected. This determination is based on a detection signal from the zero point detection unit 153. If it is determined at the step 173 that the zero point is detected, the routine proceeds to the step 174 for determining whether the distance between the zero point and the stroke end point is the normal length. When the zero point is not detected for over a predetermined period, the routine returns to the step 170, so as to repeat the above procedures.

After the completion of pre-running operations of respective strokes, tile pre-running operation for swing motion accomplished by the swing motor 10 is executed. That is, the control/operation unit 151 controls the swing control unit 155 so that the swing motor 10 is swung 45° right. The time consumed in this operation is determined, on the basis of a detection signal from the swing angle detection unit 156. If the swing period is, for example, over 2.5 seconds, the operation is stopped and an alarm is generated. Thereafter, the swing motor 10 is swung 90° left. In the same manner, it is determined whether the swing operation is normally carried out.

In the abovementioned embodiment of the present invention, the pre-running operation is accomplished by only one time button manipulation, so that errors of respective operating elements can be automatically checked.

As described above, the automatic actuating system for the actuators of excavator according to this invention provides several advantages as follows.

First, the present invention provides an automatic actuating system for actuators of the excavator in which an automatic control process for controlling an overloaded bucket to be free from the overloaded state is provided. Thus, even when the bucket is caught on an overload over a load level such as due to being caught on heavy rock or containing large volume of soil therein, the overloaded bucket is automatically controlled so as to move in a desired distance in a direction opposite to the excavating direction and then move up to a height in order to be free from the overloaded state thereof. Thereafter, the operator handles the control levers/pedals so that the bucket free from the overloaded state continuously carries out its desired excavating operation. Thus, this system provides an advantage in that it allows even an unskilled operator to easily operate the actuators even when an overload occurs on the bucket during an excavating operation, thereby making the overloaded bucket be free from overloaded state thereof, and also, it efficiently protects the actuators and the operating members of the excavator even when there is occurrence of overload on the bucket during the excavating operation.

Second, the present invention provides an automatic actuating system for actuators of the excavator which provides an automatic control process for maintaining position of the bucket during several operations by the excavator, such as an excavating operation, a loading operation and the like. Thus, the desired angular position of the loaded bucket with respect to the absolute horizontal line of the ground surface is automatically controlled not to change even when another actuators except for the bucket cylinder are actuated upon positioning the control lever for the bucket cylinder at the neutral position, thereby preventing the objects contained in the bucket from being dropped, therefore, this system provides an advantage of removing difficulty in handling the control levers/pedals for the actuators at the same time and reducing fatigue of the operator and also improving the working effect of the excavator.

Third, the present invention provides an automatic actuating system for actuators of the excavator which provides an automatic control process for controlling position of the bucket during surface finishing operation. Thus, the bucket cylinder or the boom cylinder is automatically controlled by means of simple handling for the control levers/pedals for dipper cylinder and swing motor so that the front tip or the bottom of the bucket continuously contacts with the ground surface which is to be adjusted. Thus, this system provides an advantage of simplifying the handling of the control levers/pedals during the land re-adjuring operation, and removing occurrence of fatigue of the operator and also improving the working effect of tile excavator.

Fourth, the present invention provides an automatic actuating system for actuators of the excavator which provides a control unit and an automatic control process for automatic limiting the actuating range of the actuators. Thus, the operating members, such as the bucket, the boom, the dipper stick and the like, are actuated within a previous set operating ranges so that the operating members during operations are prevented from striking to obstacles, such as neighboring buildings. Therefore, this system provides an advantage of preventing a safety accident resulting from the striking and simplifying the handling of the control levers/pedals and removing occurrence of fatigue of the operator and also improving the working effect of the excavator.

Fifth, the present invention provides an automatic actuating system for actuators of the excavator which provides an automatic control process for controlling the quantity of hydraulic fluid flow of the main hydraulic pumps. Thus, the main hydraulic pumps each outputs an equal hydraulic power to respective actuators connected to each pump in proportion to respective loads each loaded on the actuators. In case that several actuators are actuated at the same time, each hydraulic pump distributes proportional quantity of hydraulic fluid flow to respective actuators directly connected thereto in proportion to respective loads on the actuators so as to drive the actuators at an equal speed. Also, in case of occurrence of shortage of required quantity of fluid flow on an actuator due to overload thereon, a main pump directly connected to the actuator supplies a part of the required quantity of fluid flow to the actuator, and also the other main pump crossconnected to the actuator supplies the shortage of required quantity of fluid flow to the actuator by way of the cross line. Therefore, this system provides an advantage of improving the distribution performance of hydraulic fluid of the main pumps, preventing overload of the hydraulic pumps and improving the independent handling performance of each actuator.

Sixth, the present invention provides an automatic actuating system for actuators of the excavator which provides a control unit and an automatic control process for pre-running the actuators. Thus, the pre-running for respective actuators is performed by a simple handling. Therefore, this system provides an advantage of automatic checking for respective actuators and improving operational easiness and the working effect of the excavator.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A process for automatically controlling an apparatus for operating an excavator, said apparatus including a pair of adjustable volume hydraulic pumps with swash plates and swash plate control valves, an engine operably connected to the hydraulic pumps, a plurality of actuators operably connected to said hydraulic pumps, directional control valves operably connected to the pumps and actuators, and control levers and control pedals for generating electric control signals to control the actuators, the process comprising the steps of:

determining displacement values for said actuators to be actuated in response to electric control signals received from the control levers and control pedals for controlling said actuators;

determining a quantity of hydraulic fluid under pressure to be delivered from said hydraulic pumps to said actuators;

determining values representing the desired position of the directional control valves in order to cause the determined quantity of hydraulic fluid under pressure to be efficiently supplied to said actuators; and limiting the output volume of said hydraulic pumps in accordance with the determined quantity of the hydraulic fluid to be supplied to said actuators and in accordance with the determined values of said directional control valves by outputting electric signals representing the limited pump output volumes of said hydraulic pumps to the swash plate control valves by way of an amplifier so as to control inclination angles of swash plates on said hydraulic pumps and in turn control the pump output volumes.

2. A process for automatically controlling an apparatus for operating an excavator, said apparatus including a pair of hydraulic pumps driven by an engine, a plurality of actuators actuated operably connected to said hydraulic pumps, directional control valves operably connected to the actuators, and control levers and control pedals for generating electric control signals to control the actuators, the process comprising the steps of:

determining handling values of the control levers and control pedals for controlling said actuators upon reception of electric control signals outputted from said control levers and control pedals;

calculating desired actuation speeds of said actuators in accordance with the determined handling values of said control levers and control pedals;

calculating actual actuation speeds of said actuators as sensed by displacement sensors on said actuators;

comparing the desired actuation speeds of said actuators with the actuation speeds of said actuators and determining whether said actuators are overloaded;

determining whether at least two actuators are being driven at the same time and whether at least two actuators are being driven by both of said hydraulic pumps, and further determining whether a control process for removing an overload condition on said actuators was performed in a previous operation of the excavator, still further determining whether controlled actuation speeds stored in the apparatus are equal to the actual actuation speeds of said actuators;

outputting electric signals representing the controlled actuation speeds of said actuators when it is determined that the actual actuation speeds of said actuators are equal to the controlled actuation speeds of said actuators, but calculating a quantity of hydraulic fluid under pressure to be supplied to said actuators in accordance with a given load on said actuators when it is determined that the actual actuation speeds of the actuators are not equal to the controlled actuation speeds of the actuators; and outputting control signals to the directional control valves for controlling said directional control valves according to the quantity of hydraulic fluid to be supplied to said actuators.

* * * * *

UNITED STATES PATENT AND TRADEMARK OFFICE
CERTIFICATE OF CORRECTION

PATENT NO. : 5,308,219

DATED : May 3, 1994

INVENTOR(S) : Jin H. Lee et al.

It is certified that error appears in the above-indentified patent and that said Letters Patent is hereby corrected as shown below:

Column 6, line 17;
  "and" should be --are--. (2nd occurrence).

Column 10, line 24;
  "outpointed" should be --outputted--.

Column 11, line 11;
  "For" should be --for--.

Column 11, line 52;
  "The" should be --the--.

Column 12, line 40;
  "turtled" should be --turned--.

Column 13, line 31;
  After "values" insert --$\theta i$--.

Column 15, lines 26 and 31;
  "60" should be --$\int\theta$--.

Column 15, line 52;
  "60" should be --$\int\theta$--.

Column 16, line 50;
  After "$\theta'_W$" insert -- = --.

Column 18, line 17;
  "tile" should be --the--.

Column 18, line 24;
  "ttie" should be --the--.

UNITED STATES PATENT AND TRADEMARK OFFICE
CERTIFICATE OF CORRECTION

PATENT NO. : 5,308,219
DATED : May 3, 1994
INVENTOR(S) : Jin H. Lee et al.

It is certified that error appears in the above-indentified patent and that said Letters Patent is hereby corrected as shown below:

Column 18, line 25;
  "tile" should be --the--.

Column 18, line 33;
  "127" should be --12,--.

Column 18, line 54;
  "select panel 7B" should be --select panel 78--.

Column 21, line 9;
  "Lo" should be --to--.

Column 22, line 21;
  "cal" should be --car--.

Column 23, line 16;
  "ti)e" should be --the--.

Column 24, line 4;
  "tile" should be --the--.

Column 27, line 40;
  "mare" should be --more--.

Column 29, line 21;
  "mariner" should be --manner--.

Column 32, line 4;
  "1 n" should be --in--.

Column 34, line 11;
  "tile" should be --the--.

UNITED STATES PATENT AND TRADEMARK OFFICE
CERTIFICATE OF CORRECTION

PATENT NO. : 5,308,219

DATED : May 3, 1994

INVENTOR(S) : Jin H. Lee et al.

It is certified that error appears in the above-indentified patent and that said Letters Patent is hereby corrected as shown below:

Column 36, line 36;
      "tile" should be --the--.

Column 36, line 60;
      "pomp" should be --pump--.

Signed and Sealed this

Third Day of January, 1995

*Attest:*

BRUCE LEHMAN

*Attesting Officer*     *Commissioner of Patents and Trademarks*